US008885705B2

(12) United States Patent
Schoenblum

(10) Patent No.: US 8,885,705 B2
(45) Date of Patent: Nov. 11, 2014

(54) DIGITAL STREAM TRANSCODER WITH A HYBRID-RATE CONTROLLER

(75) Inventor: Joel W. Schoenblum, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 1634 days.

(21) Appl. No.: 11/671,690

(22) Filed: Feb. 6, 2007

(65) Prior Publication Data

US 2007/0127566 A1 Jun. 7, 2007

Related U.S. Application Data

(63) Continuation of application No. 10/658,131, filed on Sep. 9, 2003, now Pat. No. 7,190,723, which is a continuation-in-part of application No. 10/635,406, filed on Aug. 6, 2003, now Pat. No. 7,295,610, which is a continuation-in-part of application No. 10/397,658, filed on Mar. 26, 2003, now Pat. No. 7,236,521.

(60) Provisional application No. 60/368,068, filed on Mar. 27, 2002.

(51) Int. Cl.
| H04N 7/26 | (2006.01) |
| H04N 7/01 | (2006.01) |
| H04N 19/157 | (2014.01) |
| H04N 19/93 | (2014.01) |
| H04N 19/48 | (2014.01) |
| H04N 19/124 | (2014.01) |
| H04N 19/172 | (2014.01) |
| H04N 19/61 | (2014.01) |
| H04N 19/174 | (2014.01) |
| H04N 19/40 | (2014.01) |
| H04N 19/547 | (2014.01) |
| H04N 19/126 | (2014.01) |
| H04N 19/583 | (2014.01) |
| H04N 19/147 | (2014.01) |
| H04N 19/115 | (2014.01) |
| H04N 19/90 | (2014.01) |
| H04N 7/48 | (2006.01) |
| H04N 7/50 | (2006.01) |

(52) U.S. Cl.
CPC ... *H04N 19/00096* (2013.01); *H04N 19/00212* (2013.01); *H04N 19/00957* (2013.01); *H04N 19/00563* (2013.01); *H04N 19/0009* (2013.01); *H04N 19/00266* (2013.01); *H04N 19/00781* (2013.01); *H04N 19/00272* (2013.01); *H04N 19/00472* (2013.01); *H04N 19/00636* (2013.01); *H04N 7/26941* (2013.01); *H04N 19/00733* (2013.01); *H04N 19/00175* (2013.01); *H04N 19/0006* (2013.01); *H04N 19/00945* (2013.01)
USPC .............................. 375/240.03; 375/240.26

(58) Field of Classification Search
USPC ..................................................... 375/240.03
See application file for complete search history.

(56) References Cited

U.S. PATENT DOCUMENTS 4,972,260 A * 11/1990 Fujikawa et al. ........ 375/240.03
5,333,212 A *  7/1994 Ligtenberg .................... 382/250

(Continued)

OTHER PUBLICATIONS

"Scalable Video Transmission by Separating & Merging of MPEG-2 bitstream", Aug. 22, 2001, pp. 17-20.

(Continued)

*Primary Examiner* — Christopher S Kelley
*Assistant Examiner* — David N Werner
(74) *Attorney, Agent, or Firm* — Tarolli, Sundheim, Covell & Tummino LLP

(57) ABSTRACT

A rate controller in a transcoder, which receives a stream of compressed frames carried in a bit stream, selectively determines whether to quantize and/or threshold slices of a frame carried in the stream of frames. The rate controller determines the input size of the frame and based at least in part upon at least a desired size, requantizes and/or thresholds the frame such that the output size of the frame is approximately the desired size.

39 Claims, 13 Drawing Sheets

(56) References Cited

U.S. PATENT DOCUMENTS

| | | | |
|---|---|---|---|
| 5,426,463 A * | 6/1995 | Reininger et al. | 375/240.03 |
| 5,537,440 A | 7/1996 | Eyuboglu et al. | |
| 5,657,015 A | 8/1997 | Nakajima et al. | |
| 5,870,146 A | 2/1999 | Zhu | |
| 5,883,979 A * | 3/1999 | Beretta et al. | 382/251 |
| 6,058,143 A | 5/2000 | Golin | |
| 6,081,295 A | 6/2000 | Adolph et al. | |
| 6,141,447 A | 10/2000 | Linzer et al. | |
| 6,167,084 A | 12/2000 | Wang et al. | |
| 6,208,688 B1 * | 3/2001 | Seo et al. | 375/240.03 |
| 6,259,741 B1 | 7/2001 | Chen | |
| 6,275,536 B1 | 8/2001 | Chen et al. | |
| 6,301,392 B1 * | 10/2001 | Acharya | 382/239 |
| 6,351,226 B1 | 2/2002 | Saunders et al. | |
| 6,400,763 B1 | 6/2002 | Wee | |
| 6,407,681 B2 | 6/2002 | Gatepin et al. | |
| 6,434,197 B1 | 8/2002 | Wang et al. | |
| 6,441,754 B1 | 8/2002 | Wang et al. | |
| 6,459,731 B1 * | 10/2002 | Matthews et al. | 375/240.03 |
| 6,526,099 B1 | 2/2003 | Christopoulos et al. | |
| 6,570,922 B1 | 5/2003 | Wang et al. | |
| 6,628,839 B1 | 9/2003 | Komiya et al. | |
| 6,748,020 B1 | 6/2004 | Eifrig et al. | |
| 6,771,703 B1 | 8/2004 | Oguz et al. | |
| 6,950,463 B2 | 9/2005 | Moni et al. | |
| 6,959,116 B2 | 10/2005 | Sezer et al. | |
| 7,010,037 B2 | 3/2006 | Ye et al. | |
| 2001/0003534 A1 * | 6/2001 | Saunders et al. | 375/240.16 |
| 2001/0021221 A1 * | 9/2001 | Morel | 375/240.03 |
| 2002/0110193 A1 * | 8/2002 | Yoo et al. | 375/240.02 |
| 2002/0159457 A1 | 10/2002 | Zhang et al. | |
| 2002/0176504 A1 | 11/2002 | Zaccarin et al. | |
| 2002/0191696 A1 * | 12/2002 | Moni et al. | 375/240.03 |
| 2003/0002581 A1 * | 1/2003 | Moni et al. | 375/240.03 |
| 2003/0161407 A1 * | 8/2003 | Murdock et al. | 375/240.29 |

OTHER PUBLICATIONS

Bernd Sostawa, et al., "DSP-Based Transcoding of Digital Video Signals with MPEG-2 Format," IEEE Transactions on Consumer Electronics, vol. 46, No. 2, May 2000, pp. 358-362.

Pedro A.A Assuncao and Mohammed Ghanbari, "A Frequency-Domain Video Transcoder for Dynamic Bit-Rate Reduction of MPEG-2 Bit Streams", IEEE Transactions on Circuits and Systems for Video Technology, vol. 8, No. 8, Dec. 1998, pp. 953-967.

Shih-Fu Chang and David G. Messerschmitt, "Manipulation and Compositing of MC-DCT Compressed Video", IEEE Journal on Selected Areas in Communications, vol. 13, No. 1, Jan. 1995, pp. 1-11.

R. Klein Gunnewieck, et al., "THAM 15.5, A low-complexity MPEG-2 bit-rate transcoding algorithm," IEEE, Jun. 2000, pp. 316-317.

Shizhong Liu and Alan C. Bovik, "Local Bandwidth Constrained Fast Inverse Motion Compensation for DCT-Domain Video Transcoding," The University of Texas at Austin, TX, May 2002 IEEE, pp. 1609-1612.

Junehwa Song and Boon-Lock Yeo, "A Fast Algorithm for DCT-Domain Inverse Motion Compensation Based on Shared Information in a Macroblock," IEEE Transactions on Circuits and Systems for Video Technology, vol. 10, No. 5, Aug. 2000, pp. 767-775.

* cited by examiner $$\begin{bmatrix} a & 0 & 0 & c & 0 & 0 \\ b & 0 & d & g & 0 \\ 0 & 0 & 0 & 0 \\ e & 0 & 0 \\ f & h \\ 0 \end{bmatrix}\underset{614}{}$$

$$\underset{616}{}\begin{bmatrix} r_0= 0 & l_0= a \\ r_1= 1 & l_1= b \\ r_2= 3 & l_2= c \\ r_3= 0 & l_3= d \\ r_4= 1 & l_4= e \\ r_5= 0 & l_5= f \\ r_6= 2 & l_6= g \\ r_7= 5 & l_7= h \\ r_8= 0 & l_8= 0 \end{bmatrix}$$

$$\underset{616}{}\begin{bmatrix} & l_0= a \\ r_1= 1 & l_1= b \\ r_2= 3 & l_2= c \\ r_3= 0 & l_3= d \\ r_4= 1 & l_4= e \\ r_5= 0 & l_5= f \\ r_6= 2 & l_6= g \\ r_7= 5 & l_7= h \\ r_8= 0 & l_8= 0 \end{bmatrix}$$

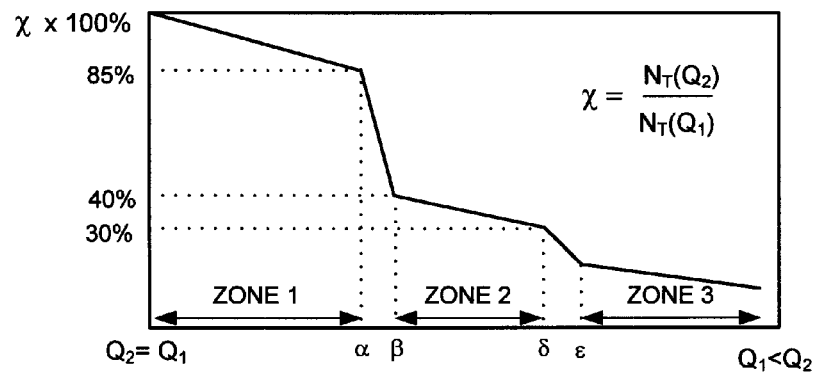

FIG. 10

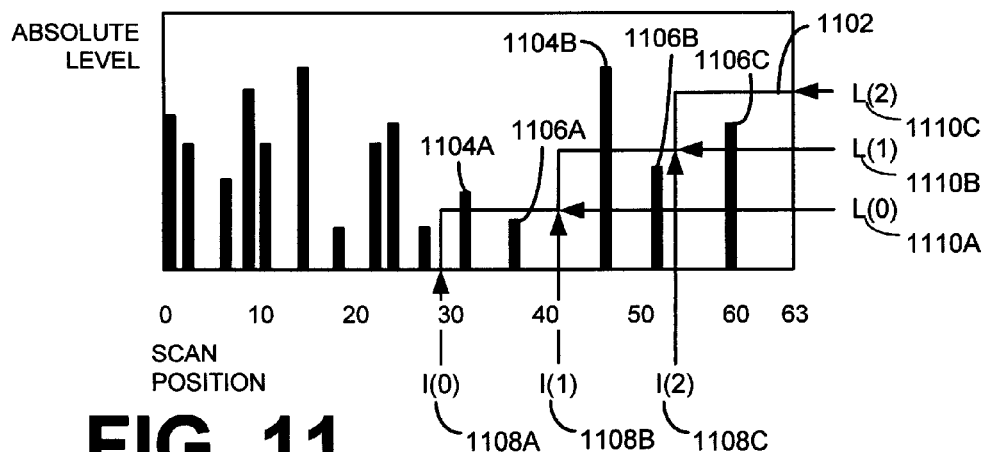

FIG. 11 ary application Ser. No. 10/658,131 filed Sep. 9,# DIGITAL STREAM TRANSCODER WITH A HYBRID-RATE CONTROLLER

CROSS-REFERENCE TO RELATED APPLICATION

This application is a continuation of U.S. utility application entitled "Digital Stream Transcoder with a Hybrid-Rate Controller" having application Ser. No. 10/658,131 filed Sep. 9, 2003 that issued as U.S. Pat. No. 7,190,723 on Mar. 13, 2007, which is entirely incorporated herein by reference and which claims benefit to a continuation-in-part of U.S. application Ser. No. 10/635,406, filed on Aug. 6, 2003 that issued as U.S. Pat. No. 7,295,610 on Nov. 13, 2007, which is a continuation-in-part of U.S. application Ser. No. 10/397,658, filed Mar. 26, 2003 that issued as U.S. Pat. No. 7,236,521 on Jun. 26, 2007, which claimed priority to U.S. provisional application having Ser. No. 60/368,068, filed Mar. 27, 2002, all of which are entirely incorporated herein by reference.

TECHNICAL FIELD

The present invention is generally related to broadband communication systems, and, more particularly, is related to transcoding compressed streams of information in broadband communication systems.

BACKGROUND OF THE INVENTION

Modern subscriber television systems (STS) transmit digital content, which is packetized, from a headend to a subscriber. The digital content is typically provided in a format such as MPEG or in other packet formats known to those skilled in the art. An operator of an STS typically prefers to provide programs in digital format because digital programs provide superior fidelity and because digital programs are compressed so that they generally use less bandwidth than analog programs. Digital programs are compressed using, in part, a quantization parameter.

Frequently, the operator of an STS may want to convert a compressed digital signal of a given bit rate into a compressed digital signal of a lower bit rate by using a conventional transcoder to change the quantization parameter. A conventional transcoder used for such a purpose consists of a cascaded decoder and encoder. This combination is rather complex and expensive. In the particular case of video signals, some other aspects have to be taken into account. A coded video signal consists of a succession of encoded video-flames, where each video-frame is subdivided into a two-dimensional array of macroblocks, each macroblock being composed of blocks. A video-frame may be in the spatial domain, which is the pixel domain, and is transmitted in the frequency or transform domain, which results from a Discrete Cosine Transform (DCT) of the video-frame in the spatial domain. In addition, a video-frame may be separated into two fields: the top field formed by the odd lines of the video-frame and the bottom field formed by the even lines of the video-frame. A macroblock may be conveyed in two different formats: an interlaced format and a de-interlaced format. In the interlaced video-frame format, a macroblock is composed of lines from the two alternating fields and each DCT-block of the macroblock is formed by data from the two fields. In the de-interlaced format, a macroblock is composed of lines from the two fields, and each DCT-block of the macroblock is formed by data from only one of the two fields. Each DCT-block of a video-frame is scanned and encoded.

Before a conventional pixel-domain transcoder can requantize a bit stream, the decoder portion of the transcoder converts the bit stream into pixel domain values. The encoder portion of the transcoder then requantizes and converts the pixel domain values back into DCT-domain values.

In addition to conventional pixel-domain transcoders, there exist conventional DCT-block domain transcoders, which operate in the DCT-block domain. Such a transcoder receives a bit stream and converts the bit stream into sets of run-level pairs, where a set of run-level pairs is a compressed representation of a DCT-block, and then converts the sets of run-level pairs into DCT-blocks. The transcoder manipulates information in the DCT-block domain and then reconverts the DCT-blocks back into sets of run-level pairs, which are then converted back into a compressed bit stream. Further details regarding DCT-block domain transcoders can be found in "A Frequency-Domain Transcoder For Dynamic Bit-Rate Reduction of MPEG-2 Bit Streams," Assuncao et. al., IEEE Transactions on Circuits and Systems for Video Technology, Vol. 8, Issue 8, December 1998, pages 953-967, which is hereby incorporated by reference in its entirety; and "Manipulation and Compositing of MC-DCT Compressed Video," Chang et al., IEEE Journal on Selected Areas In Communications, Vol. 13, No. 1, 1995, pages 1-11, which is hereby incorporated by reference in its entirety.

There exists a need for a transcoder that reduces the bit size of a stream such that the reduced bit size is approximately equal to a desired size, and a need for a method of reducing content so as to reduce the adverse effects of content reduction.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 8A is a diagram of a quantized matrix.

FIG. 8B is a diagram of a set of run-level pairs for the quantized matrix illustrated in FIG. 8A.

FIG. 8C is a diagram of a set of run-level pairs for the quantized matrix illustrated in FIG. 8A.

FIG. 10 is a graph of bit saving versus requantization parameter.

FIG. 11 is a diagram of a threshold function.

DETAILED DESCRIPTION OF THE PREFERRED EMBODIMENTS

Figure 1:
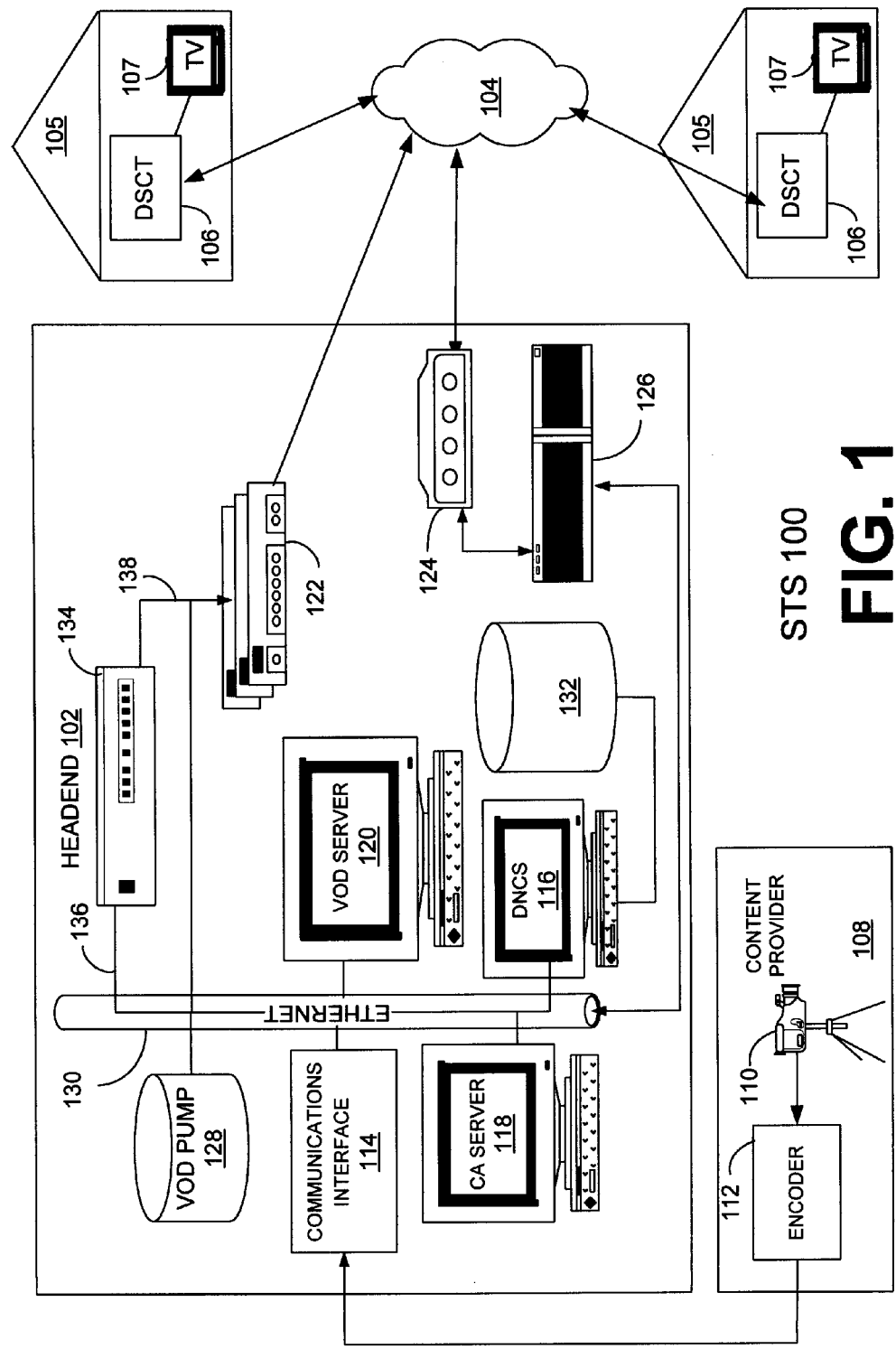
FIG. 1 is a block diagram of a broadband communications system, such as a subscriber television system, in which the preferred embodiment of the present invention may be employed.

Preferred embodiments of the present invention will be described more fully hereinafter with reference to the accompanying drawings in which like numerals represent like elements throughout the several figures, and in which several exemplary embodiments of the invention are shown. The present invention may, however, be embodied in many different forms and should not be construed as limited to the embodiments set forth herein. The examples set forth herein are non-limiting examples and are merely examples among other possible examples.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention One way of understanding the preferred embodiments of the invention includes viewing them within the context of a subscriber television system (STS). Thus, the preferred embodiments of the invention include, among other things, systems and methods for decreasing the size of transport streams carried by an STS.

Because the preferred embodiments of the invention can be understood in the context of a subscriber television system environment, an initial description of a subscriber television system (STS) is provided, which is then followed by a description of select components that are included within a headend of the subscriber television system. Also, a transcoder, which implements preferred embodiments of the invention and which is included in the headend at the headend, is described.

The preferred embodiments of the invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and are provided as an exemplary list among many other examples contemplated but not shown.

Furthermore, it should be noted that the logic of the preferred embodiment(s) of the present invention can be implemented in hardware, software, firmware, or a combination thereof. In the preferred embodiment(s), the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), a digital signal processor (DSP) etc. In addition, the scope of the present invention includes embodying the functionality of the preferred embodiments of the present invention in logic embodied in hardware or software-configured mediums.

Subscriber Television System

FIG. 1 is a block diagram depicting a non-limiting example of a subscriber television system (STS 100. In this example, the STS 100 includes a headend 102, a network 104, and multiple digital subscriber communication terminals (DSCTs) 106, which are located at subscriber premises 105.

It will be appreciated that the STS 100 shown in FIG. 1 is merely illustrative and should not be construed as implying any limitations upon the scope of the preferred embodiments of the invention. For example, the STS 100 can feature a plurality of any one of the illustrated components, or may be configured with alternative embodiments for any one of the individual components or with yet other additional components not enumerated above. Subscriber television systems also included within the scope of the preferred embodiments of the invention include systems not utilizing physical structured cabling for transmission, such as, but not limited to, satellite systems.

A DSCT 106, which is located at a subscriber's premises 105, provides among other things, a two-way interface between the headend 102 of the STS 100 and the subscriber. The DSCT 106 decodes and further processes the signals for display on a display device, such as a television set (TV) 107 or a computer monitor, among other examples. Those skilled in the art will appreciate that in alternative embodiments the equipment for first decoding and further processing the signal can be located in a variety of equipment, including, but not limited to, a computer, a TV, a monitor, or an MPEG decoder, among others.

At least one content provider 108 provides the STS 100 with digital content, which is formatted in a protocol such as, but not limited to, MPEG. Among other things, a content provider 108 can be a television station that provides "live" or "recorded" programming. A television station will include a camera 110 and an encoder 112. The encoder 112 receives content from the camera 110 and processes the content into an MPEG format, which is then provided to the headend 102 of the STS 100.

The headend 102 receives programming signals from the content providers 108, and, after processing the content from the content providers 108 according to mechanisms described hereinbelow, the headend 102 transmits programming signals to the DSCTs 106 at the subscriber premises 105. Typically, the headend 102 transmits a combination of both conventional analog signals (which will not be discussed) and digital signals.

In one implementation, the digital signals are transmitted in MPEG format and embodiments of the present invention will be discussed in terms thereof. Specifically, embodiments of the present invention are described in terms of MPEG video-frames and video-fields. However, it is to be understood that describing embodiments of the present invention employing MPEG video-frames and video-fields is merely for exemplary and clarity purposes and is not a limitation on the scope of the present invention. The scope of the present invention is intended to extend to at least to all streams of quantized information. For the purposes of this disclosure a frame of information includes video-frames, top video-fields, bottom video-fields, and other predetermined blocks of information.

As shown in FIG. 1, selected components of the example headend 102 include a communications interface 114, a digital network control system (DNCS) 116, a conditional access (CA) server 118, a video-on-demand (VOD) server 120, a transport stream transmitter 122, a quadrature phase shift keying (QPSK) modem 124, a router 126, a VOD pump 128, and a transcoder 134, which are connected via an Ethernet 130. It will be understood by those having ordinary skill in the art that the exemplary headend 102 can include additional components, such as additional servers, switches, multiplexers, transport stream transmitters, among others, or can omit some of the shown selected components.

Among other things, the DNCS 116 manages, monitors, and controls network elements and the broadcast of services provided to users. The DNCS 116 includes, among other modules, a subscriber database 132 that includes information about the subscribers for such purposes as billing information and survey data, among others. The DNCS 116 also communicates with the conditional access server 118 to provide for secure transmittal of content from the headend 102 to the DSCTs 106.

The CA server 118 selectively provides "entitlements" to the DSCTs 106 for the services and programming of the STS 100. In other words, among other things, the CA server 118 determines which DSCTs 106 of the STS 100 are entitled to access a given instance of service or program and provides the selected DSCTs 106 with, among other things, the necessary keys and authorizations to access the given instance of service. In addition, the CA server 118 informs the DNCS 116 of the entitlements of each of the DSCTs 106 in the STS 100 so that each subscriber can be properly billed. Furthermore, the CA server 118 includes a database (not shown) that includes, among other things, long term keys, the public keys of the DSCTs 106 and a private key for the CA server 118. The CA server employs long-term keys, public and private keys to securely communicate with the DSCTs 106.

The CA server 118 also provides encryption information to the transport stream transmitter 122 and to the selected DSCTs 106. The transport stream transmitter 122 employs the encryption information to encrypt the content of a program and transmits modulated programming, among other things, to the DSCTs 110 via the network 104.

The QPSK modem 124 is responsible for transporting the out-of-band IP (Internet protocol) datagram traffic between the headend 102 and the DSCT 106. Data transmitted or received by the QPSK modem 124 may be routed by the headend router 126. Among other things, the headend router 126 may be used to deliver upstream data to the various servers, such as the VOD server 120.

The transcoder 134 receives an input bit stream 136 that carries a stream of MPEG transport packets and transmits an output bit stream 138. The bit size of the output bit stream 138 is smaller than the input bit stream 136. The transcoder 134 is adapted to receive operator input and, among other things, apply a hybrid requantization-thresholding scheme on the frames of a program carried by the input bit stream 136. The hybrid requantization-thresholding scheme is performed in the DCT domain and is done such that the frames are reduced in bit size.

MPEG Compression

Before describing the transcoder 134 in detail, a brief description of MPEG video compression is provided. Further details of MPEG compression and MPEG in general can be found in MPEG-1 standards (ISO/IEC 11172), the MPEG-2 standards (ISO/IEC 13818) and the MPEG-4 standards (ISO/IEC 14496) are described in detail in the International Organization for Standardization document ISO/IEC JTC1/SC29/WG11 N (June 1996 for MPEG-1, July 1996 for MPEG-2, and October 1998 for MPEG-4), which are hereby incorporated by reference.

Figure 2A:
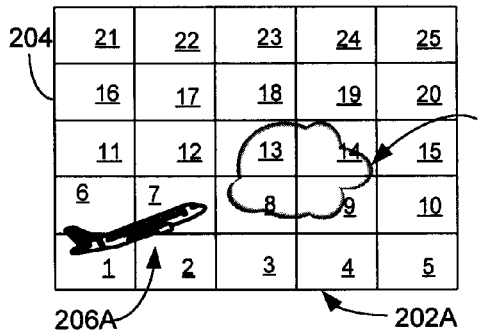
FIGS. 2A and 2B are illustrative pictures from a sequence of pictures.
Figure 2B:
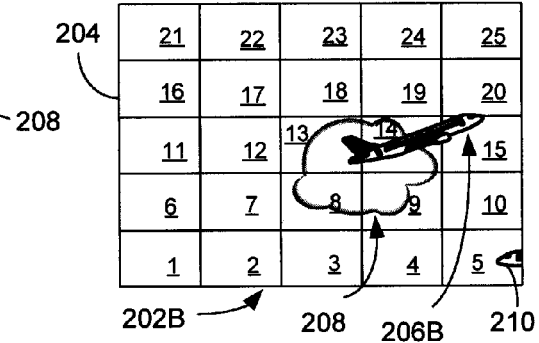

FIGS. 2A and 2B represent two pictures 202A and 202B, respectively, in a sequence of pictures. MPEG 2 segments a picture into 16×16 blocks of pixels called macroblocks 204, which in FIGS. 2A and 2B are labeled 1-25. In an actual high quality National Television System Committee NTSC) frame, there are approximately 1350 macroblocks. Each macroblock 204 has a predefined location in a picture. For example, the macroblock labeled "1" is in the bottom right hand corner of each frame. As will be described herein, each macroblock 204 if further subdivided into multiple 8×8 blocks of pixel information, which for the purposes of this disclosure are referred to as submacroblocks. A horizontal sequence of macroblocks is called a slice, and a slice can extend across the entire width of picture or a fraction of a width.

Conceptually, an MPEG 2 encoded picture consists of content information and non-content information. For purposes of this disclosure, content information is defined as the information that corresponds to pixel values in a macroblock, and non-content information corresponds to everything else necessary for processing and decoding the picture. Non-content information is generally carried in headers, examples of which include, but are not limited to, picture header, slice header, and macroblock headers. Headers typically carry information about how the picture, or portion thereof, was processed, so that the picture can be decoded and viewed. Non-content information include quantization parameters (Q1), which were used by an encoder to quantize portions of the picture and which are used to unquantize the picture. As will be explained in detail hereinbelow, content information generally corresponds to a submacroblock, and submacroblock can be represented in either pixel domain, DCT domain or run level domain. The different domains are described hereinbelow.

Picture 2A illustrates a plane 206A, a cloud 208, and background sky (not shown). The plane 206A is in macroblocks 1, 2, 6, and 7; the cloud 208 is in macroblocks 8, 9, 13, and 14; and the background sky is in all of the macroblocks 1-25. Picture 202B illustrates the scene a short time later. In picture 202B, the plane 206B is now in macroblocks 13, 14, 15, and 20, and a second plane 210 is entering the picture 202B in macroblock 5.

Figure 3:
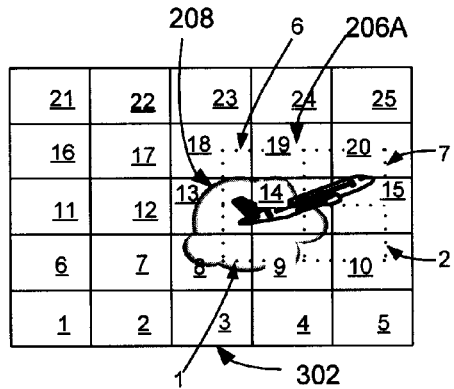
FIG. 3 is a partial picture of the picture illustrated in FIG. 2B.
Figure 4:
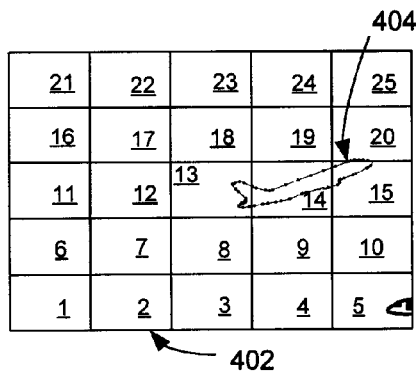
FIG. 4 is a residual picture.

FIG. 3 illustrates a predicted picture 302. The predicted picture 302 includes the plane 206A in macroblocks 13, 14, 15, and 20, and the cloud 208 in macroblocks 8, 9, 13, and 14. The predicted picture 302 is based upon information contained in picture 202A. Specifically, the plane 206A is translated from macroblocks 1, 2, 6, and 7 of picture 202A into macroblocks 13, 14, 15, and 20 of predicted image 302, and the cloud 208 is similarly translated from FIG. 2A. The macroblocks 1, 2, 6, and 7 of picture 202A are shown as dashed lines in FIG. 3. Of course, the orientation, lighting, shading and other optical characteristics of plane 206A do not exactly match the image of plane 206B. Thus, the predicted image 302 is only an estimation of the picture 202B. To compensate for the differences between the predicted picture 302 and the actual picture 202B a residual picture, illustrated in FIG. 4 is generated. The residual picture 402 is the difference between the predicted picture 302 and the actual picture 202B. For example, the difference between plane 206B and 206A is illustrated as a residual plane 404. Adding the residual plane 404 to the plane 206A generates the plane 206B.

Macroblock 5 of residual picture 402 is an example of an intracoded macroblock. The second plane 210 cannot be predicted from the reference picture 202A and consequently, does not appear in the predicted frame 402.

MPEG compresses content information using temporal compression and spatial compression. Temporal compression involves using information from a reference frame, such as picture 202A, to generate a predicted frame 402 using motion vectors. Any macroblock having content from a reference picture has at least one motion vector associated with it; the motion vectors are carried in the macroblock header of that block. The motion vector identifies a macroblock in the reference frame from which the content information is taken.

Figure 5:
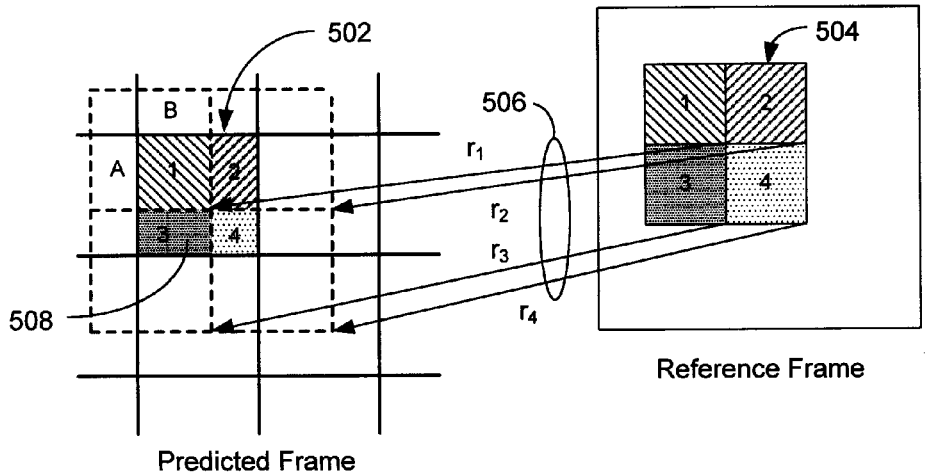
FIG. 5 is a block diagram of a motion compensated block.

Normally, a macroblock from a reference frame does not exactly coincide with the image in the current frame. For example, FIG. 5 illustrates a common situation where macroblock 502 receives information from four macroblocks 504 (1)-504(4). Each one of the reference macroblocks 504 is translated to the macroblock 502 and offset such that only a portion of each of the four reference macroblock 504 is used in macroblock 502.

MPEG-2 employs three types of pictures, I-picture, B-picture, and P-picture. I-pictures are pictures that are intra-coded, i.e., compressed using only spatial compression from that video-frame, which means that they are decompressed without reference to any other video-frame. B-pictures and P-pictures are pictures that are inter-coded, i.e., compressed using information from a reference picture such as an I-picture or a P-picture, and are also spatially compressed. P-pictures are "predicted" pictures using information from a previous reference picture, and B-pictures are "bi-directionally predicted" pictures using information from a previous reference picture and from a subsequent reference picture. In practice, a B-picture or a P-picture is not strictly an inter-coded picture, but is instead a combination of inter-coded macroblocks and intra-coded macroblocks. Macroblocks that can be predicted from reference pictures are inter-coded and those cannot be predicted are intra-coded. Each macroblock has a macroblock header associated with it, and the macroblock header identifies the macroblock as being an inter-coded or intra-coded macroblock.

A typical sequence of video pictures in display order is I(1), B(2), B(3), P(4), B(5), B(6), P(7), B(8), B(9), P(10), . . . P(N), I(N+1). The P-picture P(4) uses information from the I-picture I(1); the B-pictures B(2) and B(3) use information from the I-picture I(1) and P-picture P(4); the P-picture P(7) uses information from the P-picture P(4); and the B-pictures B(5) and B(6) use information from the P-pictures P(4) and P(7). The pictures between I(1) and P(N), inclusive, are known as a group of pictures (GOP) and typically number between 12-16, inclusive. Video pictures are not transmitted in display order. Instead, each inter-coded picture is transmitted after all of its reference pictures have been transmitted. Thus, the transmission order for a GOP is I(1), P(4), B(2), B(3), P(7), B(5), B(6), P(10), B(8), B(9), . . . P(N), B(N−2), B(N−1).

In a typical picture for display on a television, a high quality National Television System Committee (NTSC) frame is made up of approximately 1350 macroblocks. Common MPEG-2 standards include 4:2:0 and 4:2:2. In the 4:2:0 standard, a 16×16 macroblock is represented by a total of six sub-macroblocks (8×8): four 8×8 luminescent blocks; and two 8×8 color difference blocks, which are generated by down sampling each axis by a factor of 2. In the 4:2:2 standard, the chroma is not down sampled, and consequently there is twice as much chroma information. Thus, in the 4:2:2 standard, a 16×16 macroblock is represented by a total of eight sub-macroblocks. All of the sub-macroblocks of a macroblock are steered from a reference picture (I-picture or P-picture) to a temporally compressed picture (P-picture or B-picture) by a common motion vector.

Figure 6:
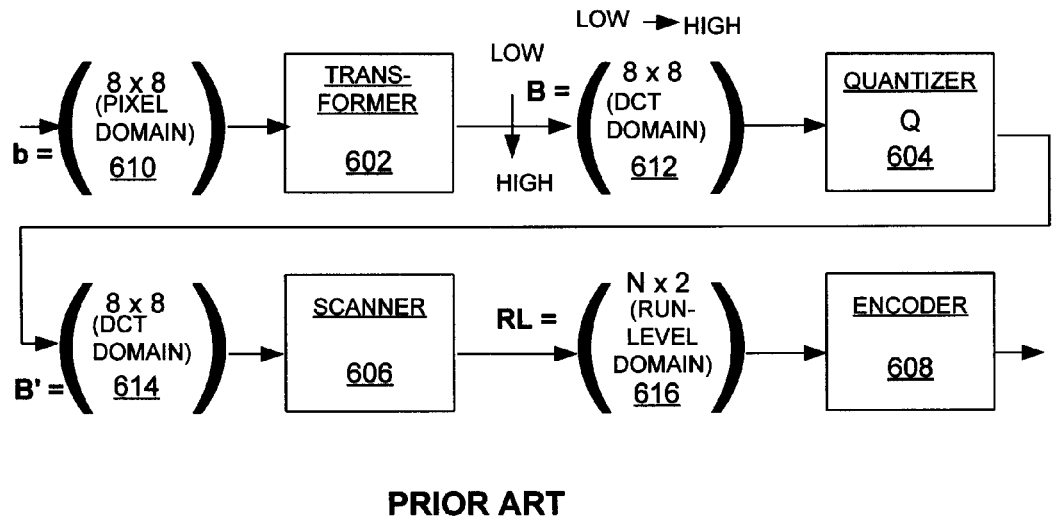
FIG. 6 is a block diagram of an encoder.

Spatial compression in MPEG-2 is based upon transforming each sub-macroblock using a two dimensional discrete cosine transform (DCT) to convert from the pixel domain to the frequency domain, also known as the DCT domain. The steps in which an MPEG encoder, such as encoder 112, spatially compresses frames are illustrated in FIG. 6. The encoder 112 includes a transformer 602, a quantizer 604, a scanner 606, and a binary encoder 608. The transformer 602 transforms each sub-macroblock of pixel information 610 of a picture into a DCT domain sub-macroblock 612 using a discrete cosine transform. The pixel domain sub-macroblock 610 is written as a matrix b, whose elements are given as b(n,m), where n and m range from 0 to 7, inclusive. The DCT domain sub-macroblock 612 is written as a matrix B, whose elements are given as B(k,j), where k and j range from 0 to 7, inclusive. The transformer 602 uses the following equation to transform from pixel domain to DCT domain:

$$B(k, j) = \frac{c(k)}{2} \frac{c(j)}{2} \sum_{n=0}^{7} \sum_{m=0}^{7} b(n, m) \cos\left(\frac{(2n+1) \cdot k\pi}{16}\right) \cos\left(\frac{(2m+1) \cdot j\pi}{16}\right), \quad (1)$$

where $c(0)=1/\sqrt{2}$ and $c(n)=1$ for $n>0$.

The zero-frequency (DC) component, B(0,0), is in the top left hand corner of DCT domain matrix 612 and the coefficient for the highest frequencies, B(7,7), is in the bottom right hand corner of the DCT domain matrix 612.

The DCT coefficients are not treated equally because the human eye is less responsive to high frequencies than low frequencies. Consequently, the quantizer 604 applies a weight factor to each of the DCT coefficients while quantizing them. Quantization converts the DCT coefficients from rational numbers into integers and usually results in a sparse representation of the quantized DCT coefficients, i.e., one in which most or a large percentage of the amplitudes of the coefficients are equal to zero. In one implementation, the quantizer 604 employs the following weight-quantization scheme:

$$B'(k,j)=\text{int}([2B(k,j)+1] \cdot Q \cdot w(k,j)/16, \quad (2a)$$

for inter-coded blocks and $$B'(k,j)=\text{int}(2B(k,j) \cdot Q \cdot w(k,j)/16, \quad (2b)$$

for intra-coded block, where int( ) is the integer function, w(k,j) is the weight factor for element (k,j), and Q is the quantization parameter. An MPEG decoder would then employ the following inverse weight-quantization scheme:

$$B(k,j)=\text{nint}(B'(k,j) \cdot 16 \cdot Q/w(k,j)), \quad (3)$$

where nint( ) is the nearest integer function. Those skilled in the art recognize that other quantization schemes, which will not be discussed, but are intended to within the scope of the invention, can also be used.

The scanner 606 performs a zig-zag scan on the quantized DCT matrix (B') 614 and produces a run-level domain matrix (RL) 616, which has the dimensions of (N+1)×2, where N is the number of non-zero coefficients in the quantized DCT matrix (B') 614. Finally, a binary encoder, or a variable length encoder (VLE), 608 converts the run-level pairs of the run-level domain matrix (RL) 616 into a bit stream using Huffman coding. It should be remembered that the preferred embodiments of the invention are being described in terms of MPEG standards, which use Huffman coding. However, the present invention is not intended to be limited to only MPEG standards and other coding techniques known to those skilled in the art can be uses in other preferred embodiments.

Figure 7A:
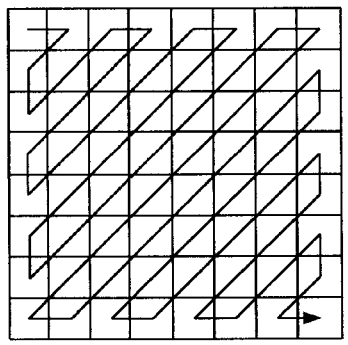
FIGS. 7A and 7B are diagrams of zig-zag scan order.
Figure 7B:
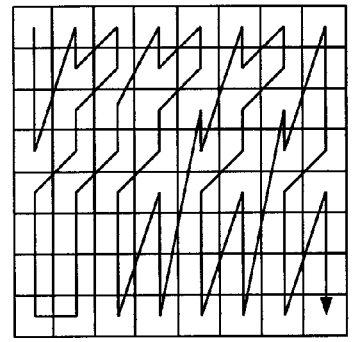

FIGS. 7A and 7B illustrate two possible scan orders. The scan order illustrated in FIG. 7A is typically implemented by the scanner 606 for scanning the quantized DCT matrix (B') 614 when the DCT matrix represents a portion of a non-interlaced video-frame. FIG. 7B illustrates the scan pattern that is typically implemented when the DCT matrix represents a portion of interlaced video-fields.

FIG. 8A illustrates an exemplary quantized DCT-domain matrix (B') 614, and FIG. 8B illustrates the corresponding run-level domain matrix (RL) 616 after the scanner 606 has employed the scan pattern illustrated in FIG. 7A on the exemplary DCT-domain matrix 614. In the run-level domain, "run" refers to the number of consecutively scanned coefficients having the value of zero that precede a non-zero coefficient, and "level" refers to the amplitude of the non-zero coefficients. The number of coefficients having the value of zero preceding the zero-frequency (D.C.) coefficient (B(0,0)=a) is zero, and thus the run-level pair for the D.C. coefficient is (0, a). The only zero coefficient interposing B(0,0) and B(1,0) is B(0,1), and thus the run-level pair for B(1,0) is given by (1, b). All of the coefficients following the B(4,1) coefficient (B(4,1)=h) are zero and are represented by an end-of-block marker, denoted by the run-level pair (0,0). Thus, after processing by the quantizer 604 and the scanner 606, the 64 (rational number) coefficients in the DCT domain matrix (B) 612 are now represented by nine pairs of runs and levels (18 integers). The conversion of 64 numbers into 18 integers (levels) reduces the number of bits necessary to represent the exemplary DCT-domain matrix 614.

FIG. 8C illustrates an alternative embodiment of a set of run-level pairs 616. In intra-coded macroblocks, MPEG-2 treats DC levels, the B(0,0) element of matrix 614, differently from the higher frequency levels. The DC level of an intra block is encoded separately from the AC coefficients since the DC coefficient is differentially coded from block to block and because the human eye is more responsive to lower frequencies. Thus, there is no run value associated with the DC level because by definition that run would have to be zero. Whereas, in an inter-coded block, all of the levels in a block including the DC level are treated the same.

An MPEG decoder such as the DSCT 106 performs inverse operations to convert a bit stream into frames. The MPEG decoder has a binary decoder (not shown) that, among other things, converts a bit stream into sets of run-level pairs, where a set of run-level pairs represents sub-macroblock of pixels. An inverse scanner (not shown) converts sets of run-level pairs into 8×8 matrices of DCT quantized coefficients. An inverse quantizer (not shown) multiplies the levels by the quotient of the quantization factor (Q) divided by the weight factor for each of the levels. Lastly, an inverse transformer (not shown) transforms the levels back into pixel domain values. Thus, MPEG encoding and decoding involve a lot of computational complexity due to, among other things, the matrix operations and DCT transformation and inverse transformations.

Transcoder

Figure 9:
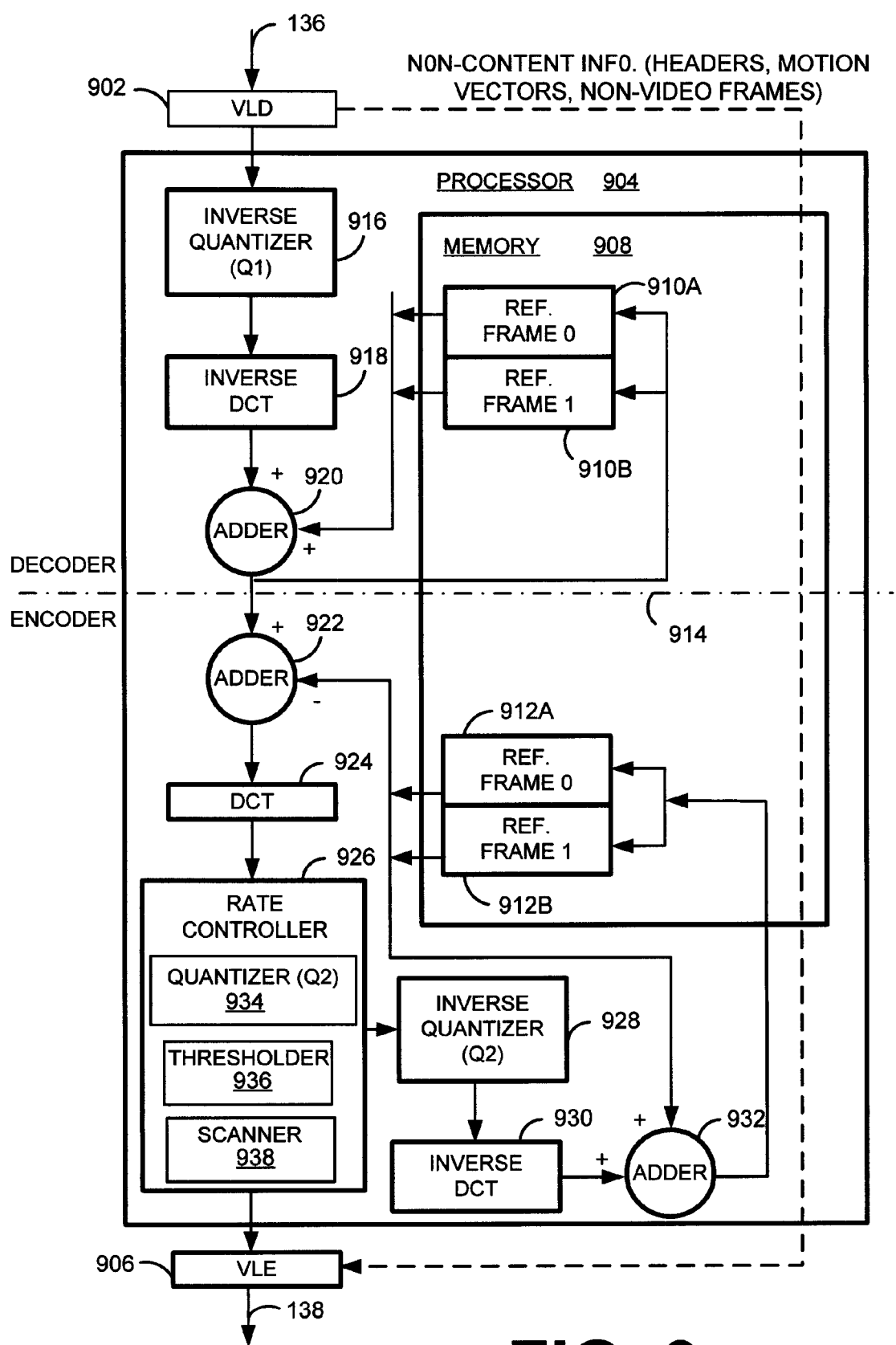
FIG. 9 is a block diagram of an embodiment of a transcoder
Figure 17:
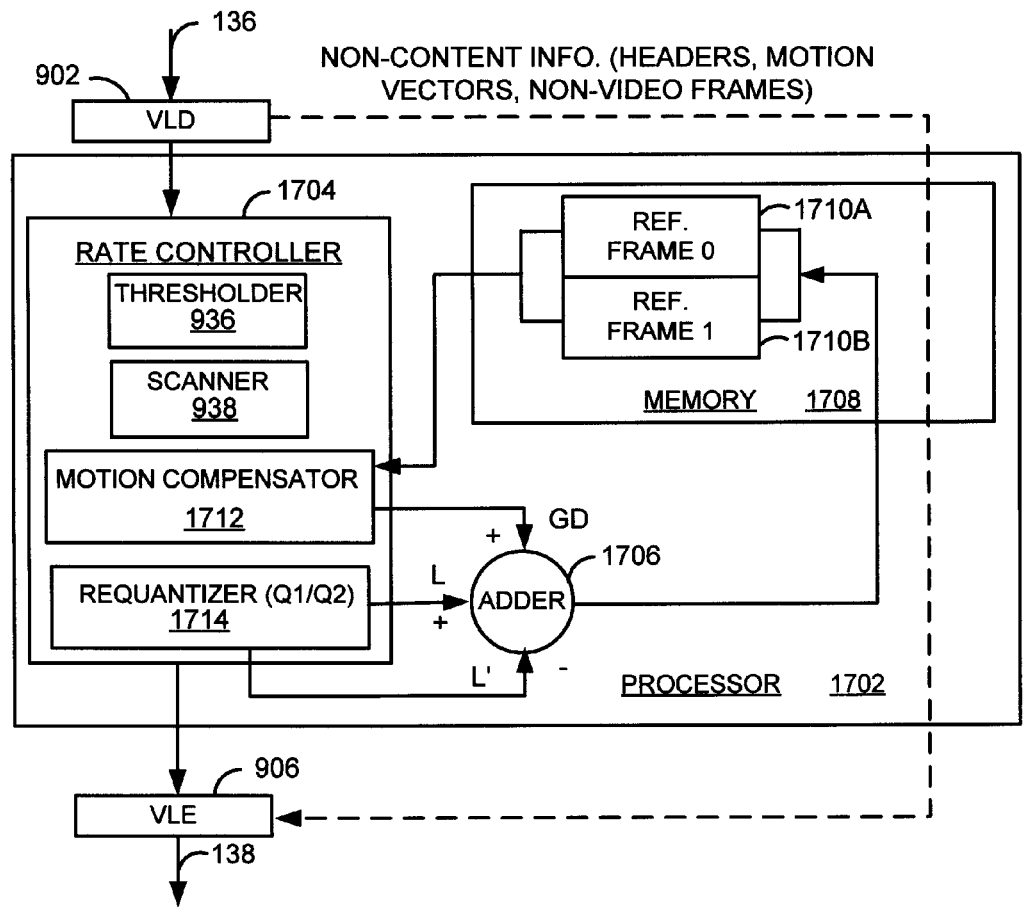
FIG. 17 is a block diagram of another embodiment of a transcoder.

Illustrated in FIG. 9 are components of a first embodiment of the transcoder 134, and FIG. 17 illustrates components of a second embodiment. Referring to FIG. 9, the transcoder 134 includes a vector length decoder 902 (VLD) a processor 904 having a memory 908, and a vector length encoder 906 (VLE). Among other things, the VLD 902 receives the input stream 136 and parses headers such as the picture headers, slice headers, macroblock headers, and others from the bit stream and provides the headers to the memory 908. In addition, the VLD 902 also parses non-video frames of information and provides the non-video frames to the memory 908 and parses sets of run level pairs from the bit stream and provides the said run level pairs to the processor 904.

The processor 904 processes frames so that, among other things, a processed frame is represented by fewer bits. The frames, video frames and non-video frames, are processed such that they are transmitted via the VLE 906 in the same order in which they were received by the VLD 902.

After processing a frame of information, the processor 904 sends the processed frame to the VLE 906. Among other things, the VLE 906 converts the processed frame into binary information and encapsulates the binary information into multiple MPEG packets. The VLE converts run level pairs from pairs of integer values into binary sequences using well-known techniques, such as, but not limited to, Huffman coding.

The memory 908 has multiple buffers such as, reference frame buffers 910A and 910B, and shaved reference frame buffers 912A and 912B, in which reference frames and corresponding shaved reference frames are buffered, respectively. For the purposes of this disclosure, a shaved reference frame is one in which the bit size of the frame has been reduced. The memory 908 also includes buffers for non-video frames of information and for headers of the video frame.

Functionally, the processor 904 can be thought of as being a cascaded encoder and decoder, which are separated by the dash line 914. An inverse quantizer module 916, and inverse DCT module 918, and adder 920, and reference frame buffers 910 make up the decoder portion, and an adder module 922, a DCT module 924, a rate controller module 926, an inverse quantizer module 928, an inverse DCT module 930, an adder module 932, and the reference frame buffers 912 make up the encoder portion.

The decoder portion of the processor 904 converts a frame from the run level domain into pixel domain. The inverse quantizer module 916 receives content information as sets of run level pairs and inverse quantizes the levels in the sets based upon the initial quantization parameters (Q1), which are carried in one or more of the headers of the frame. The inverse quantizer 916 expands the unquantized levels from the run level domain into the DCT domain, i.e., the inverse quantizer 916 converts a set of run level pairs into an 8×8 matrix representation by inverse zigzag scanning, or equivalently converting the set of run level pairs into an array of 64 levels arranged in scan order.

The inverse DCT module 918 receives content information in the DCT domain and converts the unquantized levels from frequency information back into pixel information by applying the inverse direct cosign transform to the DCT domain information.

The adder module 920 receives pixel information from the inverse DCT module 918. If the current frame is an I-picture, then the pixel information is complete. If, however, the current frame is a P-picture or B picture then the pixel information is incomplete. Using the current frame's motion vectors, the information that is missing from the current picture is received from the reference frame buffers 910. The adder module 920 adds the information from reference buffers 910 to the pixel information from the inverse DCT module 918. The output of the adder module 920 is a complete frame. If the current frame is a reference frame (I-picture or P-picture), the current frame is sent to both the reference frame buffer 910 for use with subsequent frames and to the adder module 922 of the encoder portion of the processor. B-pictures are only sent to the adder module 922.

When the current frame is an I-picture, the adder module 922 provides the current frame to the DCT module 924. However, when a current frame is a B picture or P-picture, the adder module 922 generates a residual picture, which is then provided to the DCT module 924. Using the current frame's motion vectors, the adder module 922 generates a residual picture by subtracting predicted information stored in the shaved reference buffer 912 from the current frame. The predicted information corresponds to the missing information that the adder module 920 received from the reference frame buffers 910.

The DCT module 924 converts content information from the pixel domain into the DCT domain where the levels of frequency information are unquantized. The rate controller 926 includes a quantizer 934, and a thresholder 936. The rate controller 926 implements the quantizer 934 and thresholder 936 to reduce the size of the current frame such that the compressed bit size of the current frame is approximately equal to a desired bit size ($N_D$). The desired bit size is generally a parameter that an operator of the STS has provided, or which can be provided by the DNCS 116 or by a frame-layer rate control algorithm which determines the number of bits in each picture frame based upon a target bit rate set by an operator.

The rate controller 926 determines the current compressed bit size of the current frame and determines the number of bits to shave ($N_S$) therefrom using logic described hereinbelow. The rate controller 926 quantizes, or thresholds, or quantizes and thresholds the current frame such that the compressed bit size is reduced by approximately ($N_S$).

If the current frame is a reference frame, the rate controller 926 provides the shaved frame to the inverse quantizer 928. The rate controller 926 also provides the shaved frame to the scanner 938, which converts the content information from the DCT domain into run level domain. The scanner 938 then provides the shaved frame to the VLE 906, which converts the content information from run level domain to compressed format.

The inverse quantizer 928 receives shaved reference frames from the rate controller 926 and converts the content information from quantized values into unquantized values of frequency information. The content information, which is now unquantized, is provided to the inverse DCT module 932, which converts the content information back into pixel domain information.

The adder 934 receives content information, which is now pixel domain, and uses motion vectors of the current frame to get missing information from the shaved reference frame buffers 912. The output of adder 934 is a complete shaved reference frame, which is then buffered in shaved reference frame buffers 912 for use with subsequent predicted frames, i.e., P-pictures and B-pictures. Before discussing the rate controller 926 in detail a brief description of why certain requantization parameters (Q2) are used and a description of thresholding is provided.

FIG. 10 is a graph of $\chi$ versus the requantization parameter $Q_2$, where $\chi$ is defined as the quotient of the total size of the representative frame after requantization ($N_T(Q_2)$) divided by the total size of the representative frame before requantization ($N_T(Q_1)$). In the region labeled zone 1, the magnitude of $Q_2$ increases from $Q_1$, which is the original quantization parameter, up to approximately $\alpha$, which is equal to 31 if a linear quantization scale is used, and 112 if a non-linear quantization scale is used for the picture. The rate of change of $\chi$ with respect to $Q_2$ ($d\chi/dQ_2$) is discontinuous at $Q_2=\alpha$, $\beta$, $\delta$, and $\epsilon$ and is approximately constant between each of the discontinuities. The region between $Q_2=Q_1$ to $Q_2=\alpha$ is defined as zone 1 and throughout this region there is only an approximate 15% reduction in the size of the requantized frame. In the region defined as zone 2, which extends from $Q_2=\beta$ to $Q_2=\delta$, the requantized frame is reduced by approximately 60%-70%, and in the region defined as zone 3, which extends outward from $Q_2=\epsilon$, the requantized frame is reduced at least by approximately 75%. The results shown in, FIG. 10 are for a representative frame. The actual amount of reduction can vary depending upon variables such as the content of the frame, the type of picture, and other variables. Even so, FIG. 10 illustrates that it is normally preferable to use a requantization parameter from zone 2 (or zone 3) as opposed to zone 1, because requantization in zone 1 does not produce a significant saving in size.

As those skilled in the art will recognize, as the requantization parameter $Q_2$ is increased, information is lost due to the requantization, which results in a lower quality of picture for the viewer. Thus, a balance between picture quality and size must be struck by the choice of requantization parameter $Q_2$. Preferably, the requantization parameter $Q_2$ is not chosen from zone 1 because such a parameter only reduces the size of the requantized frame by at most approximately 15%. Instead, it is preferable that thresholding is used for such small decreases in the size of the frame. If requantization is performed, then in one preferred embodiment, the requantization reduces the size of the current frame to approximately the desired size, $N_D$, and then thresholding is performed to further reduce the size such that the total size of the frame is even closer to the desired size.

FIG. 11 illustrates an exemplary threshold function 1102, which is a staired function having scan index thresholds 1108, which are labeled I(0) through I(2), and level thresholds 1110A, which are labeled L(0) through L(2). The rate controller 926 zeros levels that are beneath the threshold function 1102. The level labeled 1106A, whose scan position is between the scan index thresholds I(0) and I(1), is zeroed because the absolute value of level 1106A is less than the level threshold L(0), which extends between the scan index thresholds I(0) and I(1). On the other hand, the level 1104A is not zeroed because its absolute value exceeds the level threshold L(0). Similarly, the level 1104B is not zeroed, and the levels 1106B and 1106C are zeroed. In one preferred embodiment, the rate controller 926 thresholds the levels of a portion of a frame in parallel. In this embodiment, all of the sets of run level pairs that make up the portion are each thresholded by the same threshold function. Conceptually, as will be described in detail hereinbelow, the rate controller 926 moves the threshold function 1102 horizontally and vertically so that the correct number of levels are zeroed such that the size of the portion is reduced by approximately the appropriate amount.

Rate Controller

Figure 12:
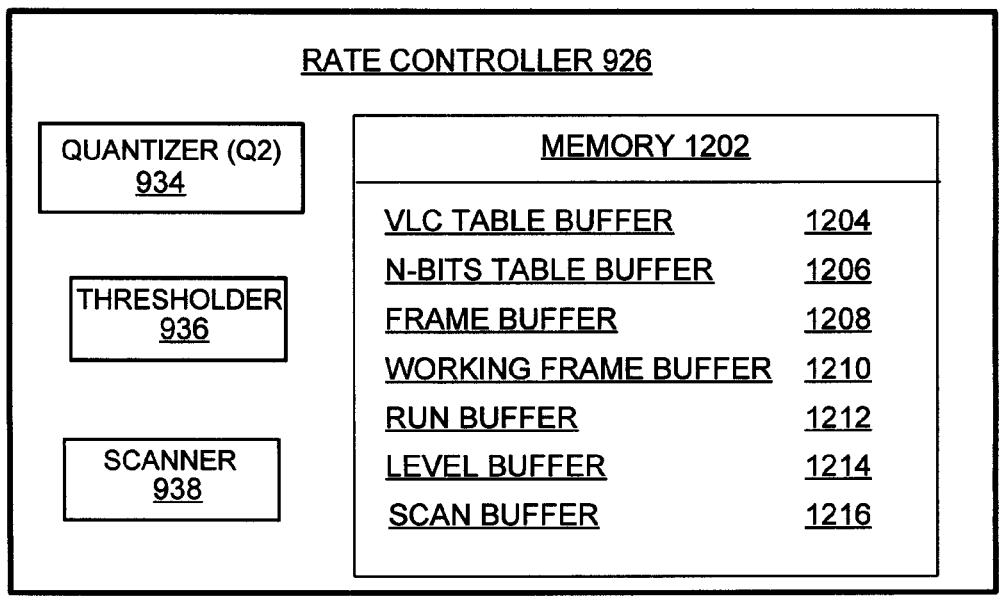
FIG. 12 is a block diagram of a rate controller.

Referring to FIG. 12, in addition to the quantizer 934, thresholder 936, and scanner 938, the rate controller 926 includes a memory 1202 having a VLC table buffer 1204, an N-bits buffer 1206, a frame buffer 1208, a working buffer 1210, a run buffer 1212, and a level buffer 1214. As those skilled in the art know, Huffman coding translates specific pairs of runs and levels to predetermined codes, which are of variable length. The most common run level pairs have the shortest codes. Some possible pairs of runs and levels are not assigned specific codes, and such run level pairs are represented by 24-bits: a 6-bit escape sequence; a 6-bit run sequence; and a 12-bit level sequence. The VLC table buffer 1204 includes a VLC table that maps the run level pairs having codes to their codes. The N-bits table buffer includes a table that maps the VLC codes to the size of the codes. Thus, the rate controller 926 can determine the compressed size of a portion of the current frame by the following equation:

$$S_{SIZE} = \sum_{J=0}^{Ncoef-1} VLC_J + 24 \times N_{ESCAPE}, \quad (4)$$

where Ncoef is the number of run level pairs in the given portion of the frame; $VLC_J$ is the number of bits of the variable length code for the $J^{th}$ run level pair in the portion and is zero if the $J^{th}$ run level pair is not in the VLC table; and N_escape is the number of run level pairs in the portion that do not have variable length codes assigned thereto. For each run level pair in the portion of the frame, the rate controller 926 first uses the VLC table to determine whether the pair has a specific code associated therewith, and if so, uses the N-bits buffer to determine the size ($VLC_J$) of the specific code.

The current frame is buffered in the frame buffer 1208. The rate controller 926 copies the frame into the working buffer 1210 when the quantizer 934 or the thresholder 936 works on the frame or a portion thereof. If the quantizer 934 processes the current frame, the result is copied into the frame buffer 1208. As will be explained in detail hereinbelow, the rate controller 926 iteratively processes the current portion until the compressed size of the portion is approximately equal to a target size. For each iteration, the thresholder 936 copies the portion of the frame from the frame buffer 1208 into the working buffer 1210.

When the rate controller 926 receives the current frame, the scanner 938 scans the DCT domain content information and determines the pairs of runs and levels for the frame. The runs and levels are buffered in the run buffer 1212 and level buffer 1214, respectively. The runs and levels are then used with the VLC table and the N-bits table to determine various quantities such as, but not limited to, the total compressed size ($N_T$) of the frame, the total compressed content size of the frame ($C_T$), and the compressed content size of portions of the frame ($S_{size}$) such as a slice. The total compressed content size ($C_T$) is the total size of all of the content information when compressed. The compressed content size of the portion of the frame ($S_{size}$) is defined as the total size of all of the content information in that portion when compressed.

In one preferred embodiment, the rate controller 926 parses the frame into portions, such as slices, and then processes the portions sequentially until the entire frame is processed. Preferably, the rate controller 926 is adapted to process the sub-macroblocks of each portion in parallel. Before processing a portion of the frame, the transcoder determines a desired bit size for the output transport stream 138. The desired bit size of the transport stream 138 is determined from operator input received through a user interface (not shown), or alternatively, received from the DNCS 116. From the user input, the transcoder determines a desired bit size ($N_D$) for the compressed frames. The rate controller 926 determines the target number of bits to shave from the portion (N_shave). After processing the portion, the rate controller 926 recalculates the compressed content size of the portion and determines the number of bits saved (N_saved), which is the difference between the initial compressed content size and the final compressed content size of the portion. The rate controller 926 then determines the reduction error (e) which is defined as the difference between the target number of bits to shave (N_shave) and the number of bits saved (N_saved), e=N_shave−N_saved. The reduction error is accumulated for each portion and the accumulated reduction error (E) is used in the determination of the number of bits to shave from subsequent portions. For the $K^{th}$ portion of the frame, N_shave is given as:

$$N_{SHAVE} = S_{SIZE} \times \frac{N_S}{C_T} + \frac{E}{N_{SLICE} - K + 1}, \quad (5)$$

where Ssize is the initial compressed content size of the $K^{th}$ portion; $C_T$ is the total compressed content size of the frame; $N_S$ is the total number of bits to shave from the frame; E is the accumulated reduction error for previously processed portions, portions 1 through K−1; and Nslice is the number of portions in the frame. The rate controller 926 also determines a reduction threshold ($R_T$), which is given as:

$$R_T = \frac{N_{SHAVE}(K)}{S_{SIZE}(K)} \quad (6)$$

The reduction threshold is used in the determination of whether or not to requantize the levels.

Figure 13:
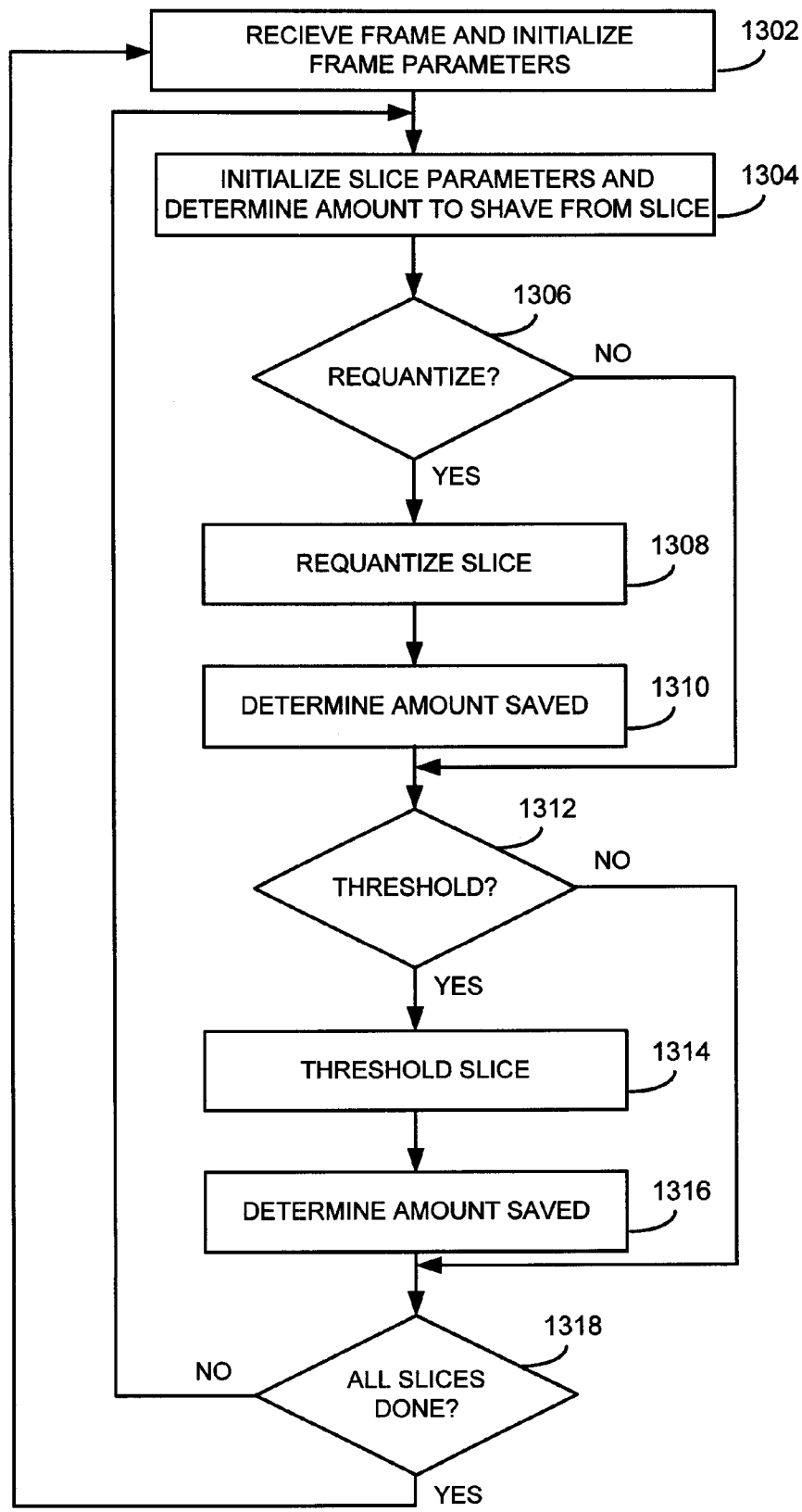
FIG. 13 is a flow chart of steps taken implementing requantization/thresholding.

FIG. 13 illustrates exemplary requantization-thresholding logic implemented by the rate controller 926. In step 1302, a frame is received by the rate controller 926. The frame is parsed and buffered in memory 1202. The rate controller 926 implements the hybrid requantization-thresholding scheme on a portion-by-portion basis. For the sake of clarity, in the discussion hereinbelow, a portion will be considered a slice. However, it is to be understood that a slice is a non-limiting example of a portion of a frame, and as those skilled in the art will recognize, the slice is an arbitrary portion of a picture and other smaller or larger portions of a picture may be utilized and are within the scope and intent of the invention. For example, a media processor or digital signal processor may have an internal cache which limits the portion of the picture which can be processed using the techniques set forth below.

The rate controller 926 initializes parameters that are used in processing the entire frame such as the accumulated reduction error (E), and picture-type (P_T), among others. The type of picture, I-picture, P-picture or B-picture, is determined from the picture header, which is stored in memory 908. During initialization, the rate controller 926 also determines the amount of bits that need to be shaved off the frame ($N_S$).

In step 1304, the rate controller 926 determines quantities such as the slice content size, $S_{SIZE}$, and the reduction threshold, $R_T$, the amount of bits to shave from the slice ($N_{SHAVE}$), and initializes slice quantities such as N_SAVED.

In step 1306, the rate controller 926 determines whether to requantize the slice. Generally, the decision whether or not to requantize is based at least in part upon a requantization threshold parameter (T) and the reduction threshold ($R_T$). The requantization threshold parameter (T) is provided to the transponder 134 by the DNCS 116 or by an operator, or is computed by a frame-layer rate control algorithm. Typically, if $R_T$ is greater than T then the slice is requantized. Other factors such as picture type and/or the initial quantization parameters used in quantizing the slice, among others, may also be used in the determination on whether to requantize or not. If the decision is not to requantize, the rate controller 926 proceeds to step 1312, otherwise, the rate controller proceeds to step 1308.

In step 1308, the rate controller 926 requantizes the levels of the current slice, and in step 1310, the rate controller 926 determines the number of bits saved by requantization. The scanner scans the sub-macroblocks of the slice and generates new sets of run-level pairs for the slice. The new sets of run-level pairs are buffered in the run buffer 1212 and level buffer 1214. The rate controller 926 uses the VLC table buffer 1204 to determine the new codes for the requantized run-level pairs and the N-bits buffer 1206 to determine the number of bits for the codes. For the Kth slice of the current frame the number of bits saved is given by the following equation:

$$N\_saved = S_{SIZE} - \left( \sum_{J=0}^{Ncoef(K)-1} VLC\_NEW_J + N\_escape_{new} \times 24 \right) \quad (7)$$

where $VLC\_NEW_J$ is the compressed bit size of the new $j^{th}$ run-level pair, which is zero if the new $j^{th}$ run-level pair is not one of the specific codes found in the VLC table buffer 1204, and $N\_escape_{new}$ is the new number of run-level pairs in the slice that are not found in the VLC table buffer 1204.

Next in step 1312, the rate controller 926 determines whether to the threshold the slice. Typically, the thresholding decision is based at least upon the number of bits saved, N_saved, which was initialized to zero in step 1304 and, if necessary, calculated in step 1310. If the number of bits saved, N_saved, is greater than or equal to the amount of bits to shave, N_shave, from the slice, the rate controller 926 proceeds to step 1318. On the other hand, if N_saved is less than N_shave, the rate controller 926 proceeds to step 1314 and thresholds the slice. Further details of the thresholding are provided hereinbelow.

Next, in step 1316, the rate controller 926 determines the amount of bits saved, N_saved. The amount of bits saved is the difference between the number of bits used to represent the slice in compressed format, e.g., using Huffman code, and the initial size of the slice in compressed format. Typically the amount of bits saved will not exactly match the desired number of bits to shave from a slice, and the difference from the two values is added to the accumulated reduction error (E).

In step 1318, the rate controller 926 determines whether all of the slices of the frame have been processed, and if so, returns to step 1302. Otherwise, it returns to step 1304 and processes the next slice in the current frame. The processing described hereinabove was described in terms of processing a slice of the frame.

Table 1 lists adjustable parameters, which are provided by the DNCS 116, or the operator, that are used by the rate controller 926 in determining whether to requantize. The adjustable parameters include the requantization threshold parameter (T), which in the preferred embodiment is an array, a quantization threshold array QT, which is a function of picture type (P_T), and LMIN, which is parameter associated with the average of the absolute value of the levels in the slice.

TABLE 1

| Parameter | Example Value |
| --- | --- |
| T(0) | 0.30 |
| T(1) | 0.40 |
| T(2) | 0.50 |
| T(3) | 0.60 |
| T(4) | 0.70 |
| QT(0, P_T) | n/a |
| QT(1, P_T) | 7 for P_T = I or P Picture, 9 for P_T = B picture |
| QT(2, P_T) | 9 for P_T = I or P Picture, 11 for P_T = B picture |

TABLE 1-continued

| Parameter | Example Value |
| --- | --- |
| QT(3, P_T) | 12 for P_T = I or P Picture, 14 for P_T = B picture |
| $L_{min}$ | 1 |

Figure 14:
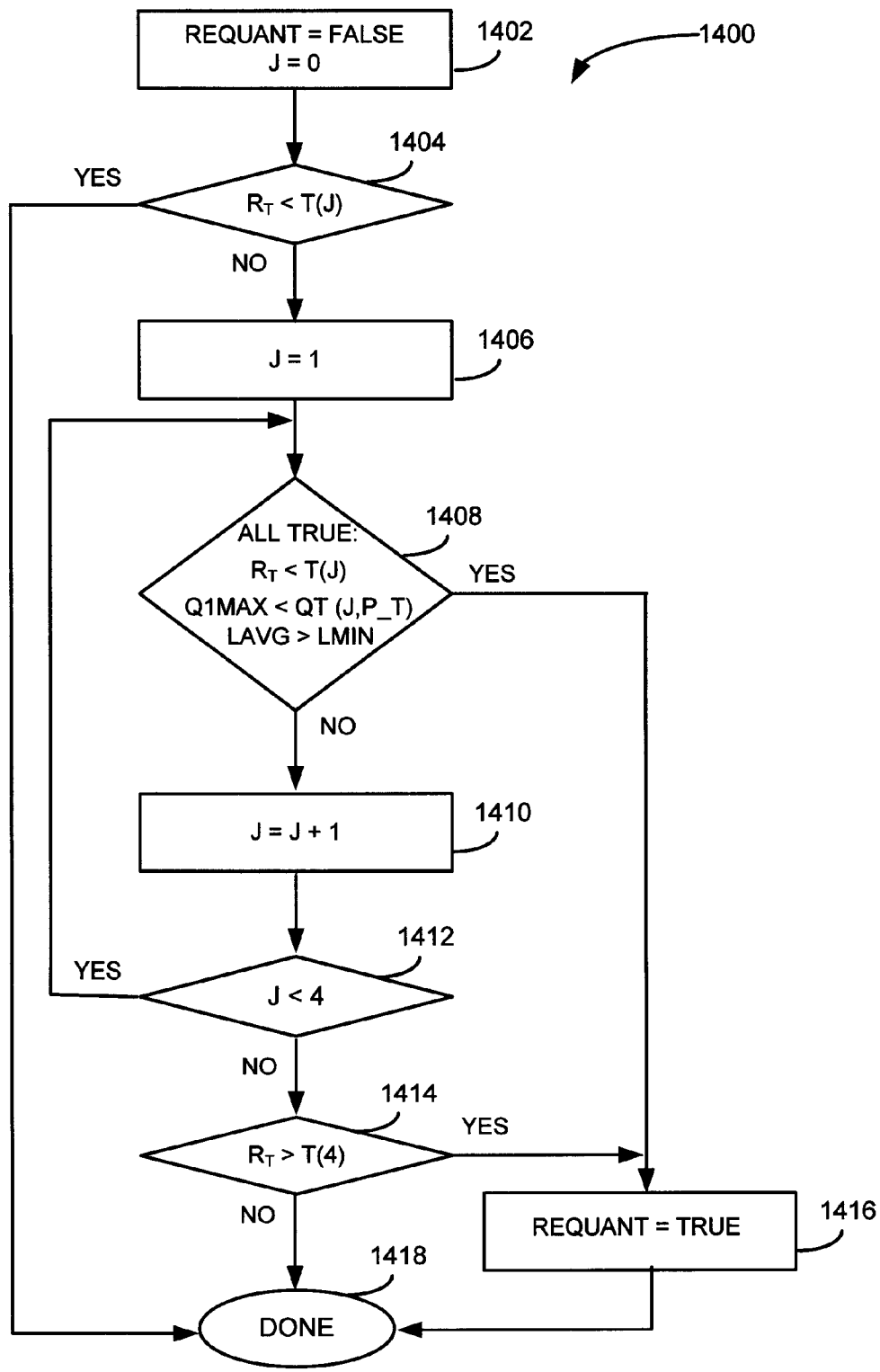
FIG. 14 is a flow chart of steps taken to determine whether to requantize.

FIG. 14 further illustrates exemplary steps 1400 for determining whether to requantize the current frame implemented by the rate controller 926 in step 1306. In step 1402, a requantization flag is set to the default position of "false", and a counter, "J," is initialized to zero. Next in step 1404, the rate controller 926 determines whether the reduction threshold, $R_T$, is less than the requantization threshold parameter T(J) for J=0. If the condition $R_T<T(0)$ is true, the rate controller 926 drops to step 1418 and is finished, which in this case means that requantization is not performed because the reduction threshold is so small that the current frame will be reduced to approximately the desired size by thresholding only. On the other hand, if the condition $R_T<T(0)$ is false, the rate controller 926 proceeds to step 1406.

In step 1406, the rate controller 926 increments the counter J, and in step 1408, the rate controller 926 determines whether all of the following conditions are true: (i) $R_T<T(J)$; (ii) Q1MAX<$Q_2$(J,P_T); and (iii) LAVG>LMIN, where Q1MAX is the maximum quantization parameter that was used to requantize the DCT blocks corresponding to the sets of run level pairs that make up the slice, and LAVG is the average of the absolute value of the levels that make up the slice. When the average absolute level of the slice LAVG is equal to 1, this means that at least half the levels of the slice have an absolute level of 1. Therefore, requantization by a factor of $2Q_1$ will necessarily zero half or more of the levels of the slice. Thus, in this situation, it is preferable to use thresholding instead of requantization to reduce the size of the slice. Only if all three conditions are true does the rate controller 926 proceed to step 1416. On the other hand, if at least one of the three conditions is false, the rate controller 926 proceeds to step 1410 and increments the counter "J". In step 1412, the rate controller 926 determines whether the counter J is less than 4. The rate controller 926 loops over steps 1408, 1410 and 1412 until either all three conditions of step 1408 are true or until J=4.

In step 1412, which is reached when J=4, the rate controller 926 determines whether the reduction threshold $R_T$ is greater than the requantization threshold parameter T(4). If so, the rate controller 926 proceeds to step 1416 and sets the requantization flag to "true" If the condition $R_T>T(4)$ is not met, the rate controller 926 drops to the last step 1418 and is finished with the requantization flag still set to the default "false". However, if the rate controller 926 reached step 1416 from either step 1408 or 1414, the requantization flag is set to "true," and then the rate controller 926 drops to the last step 1418 and is finished.

Referring back to step 1408, the three conditions of step 1408 are exemplary conditions for determining whether or not to requantize. The three conditions are used so that the various factors such as the maximum initialization quantization parameter and picture type are included in the decision along with the reduction threshold and the average of the absolute value of the levels of the slice. Those skilled in the art will recognize that the conditions listed hereinabove are non-limiting lists and that other conditions or more conditions or fewer conditions beyond those listed hereinabove for selectively determining whether to requantize can also be used.

In one preferred embodiment, the requantization parameter $Q_2$ for a set of run-level pairs is typically chosen to be $2Q_1$ or $4Q_1$, where $Q_1$ is the initial quantization parameter for the set of run-level pairs. Choosing the requantization parameter $Q_2$ to be either $2Q_1$ or $4Q_1$ is done for computational efficiency, and the determination of whether to use $2Q_1$ or $4Q_1$ is based at least in part on the desired size of the requantized frame. However, it should be noted that the choice of $2Q_1$ or $4Q_1$ is a matter of implementation, and in alternative embodiments, the requantization parameter $Q_2$ can be any quantization parameter. Typically, the default position is for $Q_2$ to equal $2Q_1$, but if the condition $R_T > T(4)$, or some other predetermined value, is true, then the value of $Q_2$ is chosen such that $Q_2 = 4Q_1$. By choosing the requantization parameter $Q_2$ to be either $2Q_1$ or $4Q_1$, the requantization parameter $Q_2$ is chosen from zones 2 or 3 of FIG. 10, respectively. Furthermore, it should be remembered that each set of run-level pairs of the current slice may not have been quantized with the same initial quantization parameter, and in that case, each set of run-level pairs is requantized using a requantization parameter that is a multiple of its initial quantization parameter, preferably $Q_2 = 2Q_1$ or $4Q_1$. Alternatively, the entire slice can be requantized using a common requantization parameter such as $Q_2 = 2Q1\max$.

Figure 15:
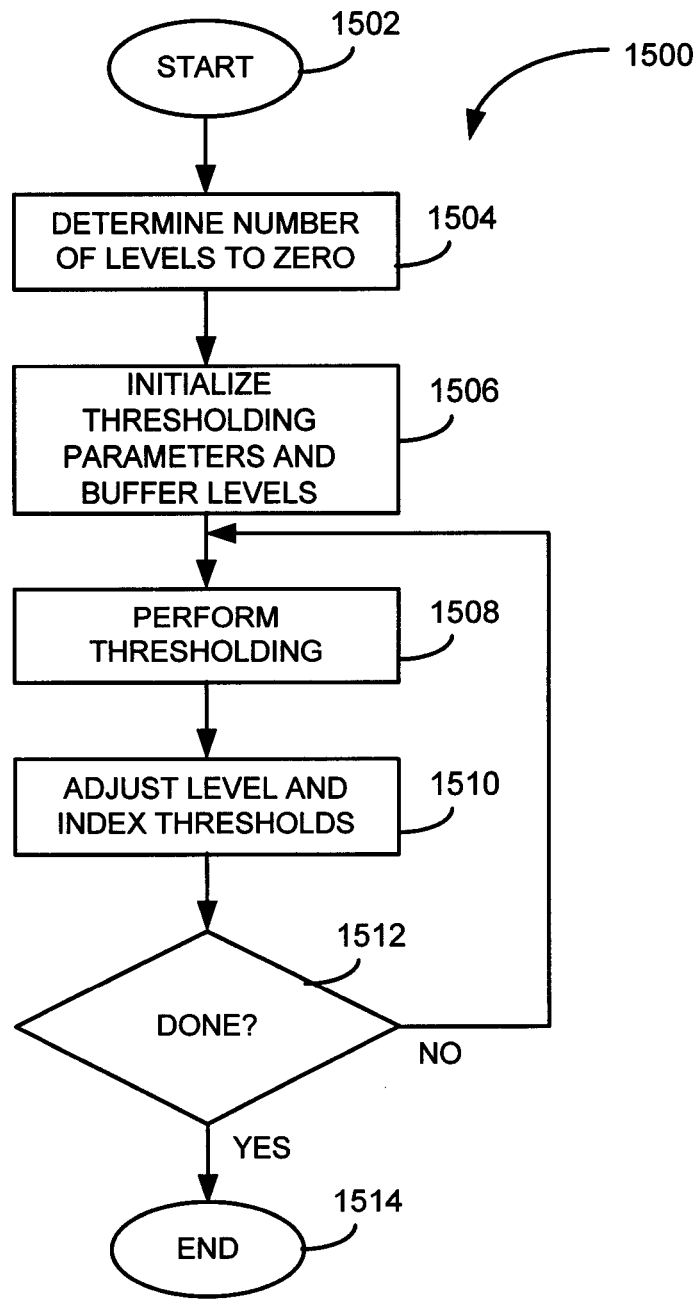
FIG. 15 is a flow chart of steps taken to threshold.

Refer to FIG. 15, steps 1500 illustrate an exemplary method to threshold the levels of a slice. The method starts at step 1502. In step 1504, the rate controller 926 determines the approximate number of levels (N_thresh) that need to be zeroed so that the size of the slice will be approximately the desired size after thresholding. The following equation is used to determine N_thresh for the current slice of the current frame:

$$N\_thresh = \frac{(Ncoef - R_Q) \times R_T \times A(\text{Run\_avg})}{S_{SIZE}}, \quad (8)$$

where, Ncoef is the number of levels in the Kth slice, $R_Q$ is the number of levels that were zeroed by requantization, Run_avg is the average run value of the current slice, and A( ) is a weighting function having Run_avg as its argument. It should be noted that $R_Q$ is initialized to zero in step 1304, and if requantization is performed, $R_Q$ is tabulated in step 1308. The weighting function A( ) strengthens the relationship from bits to levels as a function of the run average in the slice. Typically, as the average of the runs increases, the applied weight changes. For example, for an average run of zero, the run level pairs are coded efficiently using VLC, and consequently, A(0) is empirically determined to be approximately in the range of 1.2. Whereas, when the average of the runs is four, the run level pairs are not efficiently coded using VLC, and in that case, A(4) is empirically determined to be approximately in the range of 0.8.

In one preferred embodiment, the weighting function A( ) is adjusted in step 1316 based upon the actual bits saved by thresholding. This enables on-line learning/feedback of the weighting function A( ) as a function of the average of the runs.

Next, in step 1506, thresholding parameters are initialized, and the levels of the slice are buffered.

In step 1508, the rate controller 926 performs thresholding on the levels of the slice based upon the current position of the threshold function. The rate controller determines the number of sub-macroblock (Nblocks) in the slice and applies the threshold function to each sub-macroblock in the slice. The rate controller 926 determines which levels of each block are beneath the threshold function and zeros those levels.

In step 1510, the rate controller 926 adjusts the threshold function by moving it vertically or horizontally so that the number of zeroed levels are closer to the value of N_thresh, or the rate controller 926 determines not to adjust the threshold function.

In step 1512, the rate controller 926 determines whether it is done with thresholding. If the rate controller 926 is finished, the method ends in step 1514. Otherwise, the method loops back to step 1508. Each time step 1508 is entered, the levels of the slice are reset according to the buffered levels of step 1506.

Typically, the number of levels that are set to zero by thresholding will not exactly be equal to the desired value of N_thresh or be within a predetermined range of the desired value of N_thresh. Thus, in one preferred embodiment, the rate controller 926 partitions the slice into a first group and a second group of sub-macroblocks. The rate controller 926 then adjusts the threshold function for each group independently. If the total number of zeroed levels in the first and second group is still not within a predetermined range of N_thresh, the rate controller 926 transfers a predetermined number of sub-macroblocks from the second group into the first group. The rate controller 926 continues to transfer sub-macroblocks from the second group into the first group, determine the number of threshold levels, and if the number of threshold levels is not within the predetermined range of N_thresh, transfer more sub-macroblocks from the second group to the first group until the total number of zeroed levels is within the predetermined range.

Figure 16:
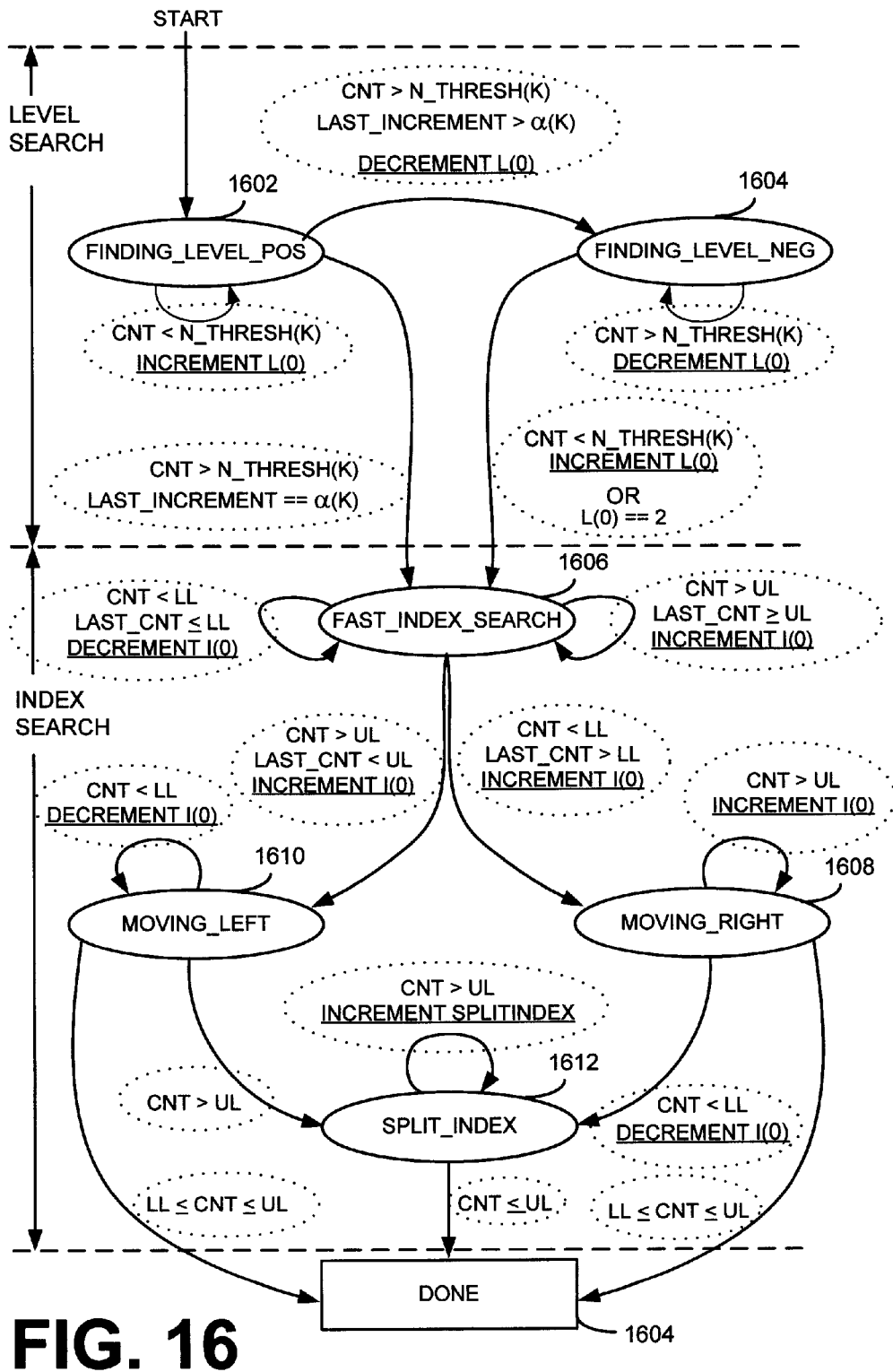
FIG. 16 is a block diagram of states of a threshold state machine.

In one preferred embodiment, the rate controller 926 implements a state machine, the states of which are illustrated in FIG. 16, for adjusting the index and threshold levels of the threshold function. The state machine can be seen as passing through a level threshold search followed by a scan index threshold search, with states along the way. Those skilled in the art will recognize that the threshold function illustrated in FIG. 11 was an exemplary threshold function having three levels and that threshold functions having a different number of levels are intended to be within the scope of the present invention. For example, presently described hereinbelow, the rate controller 926 implements a four level threshold function. Parameters that are used by the state machine are initialized in step 1506 and shown in Table 2.

TABLE 2

| Parameter | Value |
| --- | --- |
| L(0) | 2 |
| I(0) | index_thresh_min |
| SplitIndexVal | 0 |
| φ | 0.05 |
| UL | $(1 + \phi) \times$ N_thresh |
| LL | $(1 - \phi) \times$ N_thresh |
| STATE | FINDING_LEVEL_POS |
| α(K) | 1 + 5 // QAVG |
| offset$_1$ | 8 |
| offset$_2$ | 4 |
| offset$_3$ | 6 |

The parameters are defined as follows:

L(0): level threshold of index segment 0 labeled 1110A in FIG. 11;

I(0): scan index threshold of index segment 0 labeled 1108A in FIG. 11;

SplitIndexVal: the number of blocks in the first group when split indexing is performed;

φ: adjustable parameter for defining a thresholding windows;

UL: upper limit on number of number of levels thresholded to zero;

LL: lower limit on number of number of levels thresholded to zero;

$\alpha(K)$: $\alpha(K)=1+5//QAVG$, where // denotes integer division with truncation and QAVG is the average of the initial quantization parameters ($Q_1$) of the slice, and the parameter $\alpha(K$ is used for setting level threshold for indices greater than 0; and $\text{offset}_{(1,2,3)}$: tunable parameters used for setting index thresholds for indices greater than 0;

index_thresh_min: 0 for B-frame, 1 for I or P frame.

The threshold level (L) for the index segment zero of the threshold function is initialized to 2, and the remaining threshold levels of the threshold function are given as follows:

$$L(n)=L(n-1)+\alpha, \tag{9}$$

where n ranges from 1 to three. The levels are incremented $\alpha(K)$. Because $\alpha(K)$ is a function of QAVG, the average of the initial quantization parameters ($Q_1$) of the slice, the rise in the level threshold from one index segment to the next is sensitive to the quantizer scale.

The scan index threshold I(0) for of the threshold function is initialized and held at index_thresh_min (I(0)=index_thresh_min) during the level search (states FINDING_LEVEL_POS and FINDING_LEVEL_NEG), and is initialized to ISTART at the start of the index search, when the state FAST_INDEX_SEARCH is entered, where ISTART is given as follows:

$$ISTART=\gamma\times(1-R_T)\times IAVG(K) \tag{10}$$

where IAVG is the average scan position of the levels in the Kth slice and $\gamma$ is a tunable parameter and which is approximately 2.75

For the remaining scan index thresholds n=1 through 3, I(n) is given as follows:

$$I(n)=I(n-1)+\text{offset}_n \tag{11}$$

where offsets$_n$ is specified in Table 2.

All scan index thresholds I(n) for n=0 through 3 are checked to make certain that they are less than or equal to 63 because the scan positions only run to 63. If I(n) is greater than 63, it is simply set to 63.

Referring to FIG. 16, the state machine can be seen as passing through a level threshold search followed by a scan index threshold search, with states along the way. The initial state 1602 is FINDING_LEVEL_POS. In FIG. 16, conditional expressions are shown inside of dashed ellipses, and actions taken by the state machine are underlined.

STATE FINDING_LEVEL_POS:

The purpose of the initial state 1602 is to increment the level threshold L(0) until the count of the thresholded levels (cnt) exceeds the target count (N_thresh), where cnt is the number of levels zeroed. In this state, the threshold function is not moved horizontally as the state machine attempts to determine the minimum threshold levels that satisfy cnt>N_thresh. Instead, I(0) is held at index_thresh_min and the lowest level threshold L(0) is incremented by $\alpha$. The level thresholds L(1), L(2), and L(3) are recomputed as L(n)=L(n-1)+$\alpha$, for n=1, 2, and 3, until the condition cnt>N_thresh is met. Typically, the levels of a set of run-level pairs are populated most densely around small scan-positions, and consequently, during the index search, the cnt will be backed off of (made lesser) by sliding the threshold function to the right, e.g., making I(0) >index_thresh_min and recalculating I(1)-I(3).

To limit the number of iterations through this state, a higher increment than $\alpha$ may be used after a predetermined number (IT) of unsuccessful iterations, where IT is a tunable parameter, e.g., IT=5. For example, if the number of iterations is greater IT, the threshold level for the index segment zero (L(0)) can be given as:

$$L(0)=L(0)+2\times\text{iterations}. \tag{12}$$

Alternatively, a binary search can be employed. In most cases, especially in B-pictures and P-pictures where the sets of run-level pairs contain residual information, the final level threshold is often the initial guess of L(0)=2.

After the levels of the threshold function have been raised, if needed, such that the condition cnt>N_thresh is met, the height of the threshold level L(0) is considered to be a minimum if the last increment was $\alpha$. In this case, the level threshold is final and the state machine moves to the FAST_INDEX_SEARCH state 1606.

However, if instead it took a large number of iterations through this state to find L(0) and the last increment was not by $\alpha$, then the threshold level L(0) is not a minimum. In this case, the state machine proceeds to FINDING_LEVEL_NEG state 1604.

FINDING_LEVEL_NEG:

The FINDING_LEVEL_NEG state 1604 is entered after the FINDING_LEVEL_POS state 1602 zeroed more than N_thresh levels and the last increment was more than $\alpha$. Typically, this situation occurs when there is a high number of iterations and the increment for the levels is given by equation 12.

In this situation, the threshold level L(0) is not a minimum and the FINDING_LEVEL_NEG state 1604 decrements L(0) by $\alpha$, while holding the index threshold at index_thresh_min, until the condition cnt<N_thresh is met or until the threshold level L(0) is back to its initial value. If the condition cnt<N_thresh is met, then the threshold levels have been decremented too far, and in that case the threshold levels are incremented by $\alpha$.

FAST_INDEX_SEARCH:

The purpose of the FAST_INDEX_SEARCH state 1606 is to quickly find the neighborhood that the final scan index threshold is in by incrementing or decrementing the scan index threshold by a coarse increment, for example, $\beta$=4. The initial scan index thresholds I(n) (n=0 . . . 3) were set in step 1506. If cnt is less than the lower limit of the index window, LL, and the value of cnt on the last iteration of the state machine (last_cnt) was less than or equal to LL, then the index threshold I(0) is decreased by $\beta$. On the other hand, if cnt is greater than the upper limit, UL, and the preceding Cnt (last_cnt) was greater than or equal to UL, then the index threshold I(0) for is increased by $\beta$.

If cnt is greater than UL, but the preceding cnt (last_cnt) was less than UL, then the fast index search went too far left (towards lower frequencies). In this case, the index threshold I(0) is incremented by $\beta-1$ and the state is modified to the MOVING_LEFT state 1610.

If cnt is less than LL, but the preceding cnt (last_cnt) was greater than LL, then the fast index search went too far right (towards higher frequencies). In this case, the index threshold I(0) is decremented by $\beta-1$ and the state is modified to the MOVING_RIGHT state 1608.

MOVING_RIGHT:

When in the MOVING_RIGHT state 1608, the cnt is checked against UL. If (cnt>UL), then the scan index threshold I(0) is incremented by 1. If cnt becomes less than LL, then the MOVING_RIGHT state 1608 went one index too far. In this case, the scan index threshold I(0) is decremented by 1, and the state machine proceeds to the SPLIT_INDEX state 1612, where the SplitIndexVal is set to 1 block of levels.

If neither of the above conditions are satisfied, i.e. (LL<cnt<UL), then the state machine proceeds to the DONE state 1614, where state machine returns the state "Done" and stops.

MOVING_LEFT:

When in the MOVING_LEFT state 1610, the cnt is checked against UL. If (cnt>UL), then the scab index threshold I(0) is incremented by 1. If cnt becomes less than LL, then the MOVING_LEFT state 1610 went one index too far. In this case, the index threshold I(0) is decremented by 1, and the state machine proceeds to the SPLIT_INDEX state 1612, where the SplitIndexVal is set to 1 block of levels.

If neither of the two conditions above are met, i.e. (LL<cnt<UL), then the state machine proceeds to the DONEstate 1614, where state machine returns the state "Done" and stops.

SPLIT_INDEX:

The SPLIT_INDEX state 1612 splits (or segments) the levels of the slice into two segments as defined by SplitIndex-Val, so that not all levels of the slice are handled equally. The thresholding operations up until the state machine enters the SPLIT_INDEX state have SplitIndexVal=0, so there is no split index thresholding up until this point.

One reason for the SPLIT_INDEX state 1612 is that thresholding at a particular value of I(0)=4, where t is determined by the MOVING_LEFT state 1610 or the MOVING_RIGHT state 1608, results in cnt>UL but thresholding with I(0)=t+1 results in cnt<LL. In this case, it is impossible to find a scan position for the index threshold I(0) such that cnt is within the window (LL<cnt<UL). Therefore, in the first segment of levels the index threshold I(0) is set to t, and in the second segment of the index threshold I(0) is set to t+1. If the total cnt for both segments is less than UL, then the state machine proceeds to the DONE state 1614, where state machine returns the state "Done" and stops. On the other hand, if the total cnt for both segments is not less than UL, then the SplitIndexVal is incremented so that more levels are moved from the first segment to the second segment. When cnt reaches the condition (cnt<UL), the state machine proceeds to the DONE state 1614, where state machine returns the state "Done" and stops.

Hereinbelow is an exemplary pseudocode for performing split indexing over two partitions. The first partition runs from 0 to Nblocks-SplitIndexVal-1 and the second partition runs from Nblocks-SplitindexVal to Nblocks-1. The parameter SplitIndexVal controls where the dividing line between the partitions is placed. This effectively gives some fine tuning when the count of the thresholded coefficients is too large (greater than UL) at one scan index threshold but is too small (less than LL) at the neighboring index one away. Therefore, when SplitIndexVal is set to non-zero, thresholding is done with the threshold function starting at scan index I(0) for the first partition and starting at scan index I(0)+1 for the second partition. SplitIndexVal is initialized to zero at the beginning of the slice thresholding and is modified by the state machine to move the count of thresholded coefficients within the window defined between LL and UL.

Set Rest of Level and Index Thresholds:
L(n)=L(n-1)+α (1<n<3)
I(n)=I(n-1)+offset$_n$. (1<n<3)
Reset Levels (Level(j)) to original values

```
Loop w over 4 thresholds [L(0) I(0)] to [ L(3) I(3)]
{
    Loop i from 0 to Nblocks - SplitIndexVal - 1
    {
        If abs( Level(i) ) > L(n)      AND Scan-Position(i) > I(n) - 1
        {
            Level(i) = 0
        }
    }
}
Loop w over 4 thresholds [L(0), I(0)] to [L(3) I(3)]
{
    Loop i from Nblocks - SplitIndexVal to Nblocks-1
    {
        If abs( Level(i) ) > L(n)      AND Scan-Position(i) > I(n)
        {
            Level(i) = 0
        }
    }
}
```

Second Embodiment

Referring to FIG. 17, in a second preferred embodiment of the invention, the transcoder 134 includes the VLD 902, the VLE 906, and a processor 1702. The VLD 902 and VLE 906 were previously described and shall not be described again. Furthermore, in the second preferred embodiment, the rate controller 1704 determines whether or not to requantize, or threshold, or requantize and threshold using the requantization/thresholding logic illustrated in FIGS. 13-16.

The processor 1702 includes a rate controller 1704, adder 1706 and memory 1708. The memory 1708 includes drift buffers 1710A and 1710B and other buffers (not shown) for, among other things, motion vectors, headers, non-video frames, the N-bits table, and the VLC table. In addition to the thresholder 936, and scanner 938, the rate controller 1704 includes a motion compensation module 1712 and a requantizer module 1714. In this embodiment, instead of applying the motion compensation in the pixel domain, the processor 1702 applies motion compensation to in the DCT-domain.

As will be explained in detail hereinbelow, translating a block of pixel information from a reference sub-macroblock into a current sub-macroblock is equivalent to multiplying the sub-macroblock (in matrix format) by window functions. Because the window functions are unitary orthogonal matrices, the DCT transform of the product of the window function times the sub-macroblock of pixels is distributive, and consequently, the product is equal to the matrix product of the DCT representation of the window function times the DCT representation of the sub-macroblock. The set of all possible motion vectors is finite and the memory 1708 includes DCT domain motion compensation matrices, (G) that are used by the motion compensator. The drift buffers 1710 have accumulated drift for each sub-macroblock for two reference frames stored therein, where the drift of a sub-macroblock is the difference between the unquantized levels of a sub-macroblock before processing and the unquantized levels after processing, i.e., after reducing the bit size of the levels by requantization and/or thresholding. Preferably, the drift of a sub-macroblock is stored in array format, or equivalently, it can also be stored in matrix format and can be mapped back and forth between the two formats.

The rate controller 1704 receives content information included in a current frame, and the scanner 938 converts the content information from run-level domain into DCT domain. In other words, the scanner 938 expands each set of run level pairs into 64 levels, some or most of which are zero. The levels can be arranged in either an 8×8 matrix or a 64-element array. As will be explained in detail hereinbelow, it is preferable to arrange the levels of a sub-macroblock in scan order in a 64-element array and to accumulate the drift of sub-macroblocks in 64 element arrays.

The motion compensator 1712 receives accumulated drift (D) from the drift buffer 1710 and uses motion vectors to select appropriate motion compensation matrices (G). The accumulated drift is matrix multiplied by the appropriate motion compensation matrix (G) and the product (GD) is added to the submacroblock of the current frame.

When an I-picture is received by the rate controller 1704, no motion compensation is performed. However, the rate controller 1704 includes buffers for the unquantized levels, which are denoted by (L), and the unquantized levels are provided to the adder 1706. The rate controller 1704 also provides the adder 1706 with unquantized reduced levels, which are denoted by (L'). For a sub-macroblock, the unquantized reduced levels are the unquantized levels after the size of the macroblock has been reduced/shaved by requantizer 1704 and/or the thresholder 936. The drift of a sub-macroblock in an I-Picture is the difference between the unquantized levels (L) before processing and the unquantized reduced levels (L').

The adder 1706 provides the drift to the memory 1708, which buffers the drift for the sub-macroblock. Once the memory has the drift for all of the sub-macroblocks of the current frame, the drift for the frame is stored in the drift buffer 1710.

For each subsequent frame, the rate controller 1704 extracts drift from the drift buffer 1710 and applies motion compensation to it and adds the motion compensated drift (GD) to the unquantized levels of the current frame: (L)=(L)+(GD), where (L) is a matrix/array of unquantized levels for a sub-macroblock of the current frame, D is a matrix/array of the accumulated drift for a reference sub-macroblock; and (G) is the motion compensation matrix associated with the motion vector for the sub-macroblock of the current frame. The motion compensated drift (GD) is also provided to the adder 1706. The rate controller 1704 requantizes/thresholds levels of the current frame and provides the adder 1706 with both unquantized levels (L) and reduced unquantized levels (L') of the current frame. The accumulated drift for a sub-macroblock is then given by the following equation:

$$D'=(GD)+(L-L') \tag{13}$$

After D' has been calculated for all of the sub-macroblocks of the current frame, the accumulated drift of the current frame is buffered in the drift buffer 1710.

As previously described an inter-coded frame is generated at an MPEG decoder by adding pixel information from blocks in a reference frame to pixels of a residual frame. The MPEG decoder uses motion vectors, which are included in the headers of the inter-coded frame, to translate a block of pixel values from a reference frame to the inter-coded frame. Typically, a motion compensated block, one in which information is retrieved from one or more reference frames, is made up of portions of more than one reference block. FIG. 5 illustrates a common situation, which occurs when both components of a motion vector are not integer multiples of the block size, e.g., 8 pixels. The motion compensated block 502 is made up of four sub-blocks 508, which are labeled 1-4, and a residual block (not shown). Each sub-block 508 is a portion of the reference blocks 504. Sub-block 508(1) is (A×B) in size, where "A" is the number of rows of pixels and "B" is the number of columns of pixels, and corresponds to the bottom right hand corner of reference block 504(1); sub-block 508(2) is (A×(8−B)) in size and corresponds to the bottom left hand corner of reference block 504(2); sub-block 508(3) is ((8−A)×B) in size and corresponds to the top right hand corner of reference block 504(3); and sub-block 508(4) is ((8−A)×(8−B)) in size and corresponds to the top left hand corner of reference block 504(4). The motion vectors 506, $r_1$-$r_4$, translate the reference blocks 504(1)-504(4) such that the sub-blocks 508(1)-508(4) are appropriately positioned.

In matrix form, the motion compensated block 502 is denoted by $d^{mc}$ and is given by the following equation:

$$d^{mc} = \sum_{i=1}^{4} d_i, \tag{14}$$

where $d_i$ is an 8×8 matrix given by the following equation:

$$d_i = h_i^{nr} b_i w_i^{nc}, \tag{15}$$

where $b_i$ is the $i^{th}$ reference block 504, nr and nc are the number of rows and columns, respectively, of the sub-block 508(i), and $h_i^{nr}$ and $w_i^{nc}$ are of the form of upper and lower diagonal matrices having identity sub-matrices. The h matrices for the four sub-blocks 508 are as follow:

$$h_1^{nr} = \begin{bmatrix} 0 & I^{nr} \\ 0 & 0 \end{bmatrix}, h_2^{nr} = \begin{bmatrix} 0 & I^{nr} \\ 0 & 0 \end{bmatrix},$$

$$h_3^{nr} = \begin{bmatrix} 0 & 0 \\ I^{8-nr} & 0 \end{bmatrix}, \text{ and } h_4^{nr} = \begin{bmatrix} 0 & 0 \\ I^{8-nr} & 0 \end{bmatrix};$$

and the w matrices are as follows:

$$w_1^{nc} = \begin{bmatrix} 0 & 0 \\ I^{nc} & 0 \end{bmatrix}, w_2^{nc} = \begin{bmatrix} 0 & I^{8-nc} \\ 0 & 0 \end{bmatrix},$$

$$w_3^{nc} = \begin{bmatrix} 0 & 0 \\ I^{nc} & 0 \end{bmatrix}, \text{ and } w_4^{nc} = \begin{bmatrix} 0 & I^{8-nc} \\ 0 & 0 \end{bmatrix}.$$

Applying the discrete cosine transform to equation 15 yields:

$$DCT(d) = \sum_{i=1}^{4} DCT(d_i) = \sum_{i=1}^{4} DCT(h_i^{nr}) DCT(b_i) DCT(w_i^{nc}) \tag{16a}$$

$$D = \sum_{i=1}^{4} D_i = \sum_{i=1}^{4} H_i^{nr} B_i W_i^{nc}, \tag{16b}$$

because the $h_i^{nr}$ and $w_i^{nc}$ matrices are unitary orthogonal, the DCT operation is distributive. All of the matrices in equations 14-16 are 8×8 in size, and consequently, by arranging the elements of the D, $D_i$, and $B_i$ matrices in a predetermined order, such as the scan order shown in FIG. 7A, each component of equation 16b can be rewritten as $$D'_i = G_i(H_i^{nr}, W_i^{nc}) B'_i, \tag{17}$$

where the primed matrices are 64×1 in size and G, which is a function of the $H_i$ and $W_i$ matrices, is a 64×64 matrix that is calculated from the $H_i$ and $W_i$ matrices, and where the subscript "i" refers to the $i^{th}$ reference block. As shown in FIG. 5, "i" normally runs from 1-4. However, for the sake of clarity the subscript "i" will be dropped, which means that the magnitude of the components of the motion vector, which extends from the reference frame to the current frame, are each an integral number of blocks.

Consider matrices a, b, c, d and e, which are all the same size (N×N), where $$a = cbd = (cb)d = ed, \qquad (18)$$

and the (n,m) component of matrix a is given by $$a_{n,m} = \sum_{\alpha=0}^{N-1} e_{n,\alpha} d_{\alpha,m} = \sum_{\beta=0}^{N-1} \sum_{\alpha=0}^{N-1} c_{n,\beta} b_{\beta,\alpha} d_{\alpha,m}. \qquad (19)$$

Each element in the a and b matrices have a one-to-one mapping into scan order arrays, and the first element of the scan order array ($a'_0 = a_{0,0}$) is the following:

$$a'_o = \sum_{\beta=0}^{N-1} \sum_{\alpha=0}^{N-1} c_{0,\beta} d_{\alpha,0} b_{\beta,\alpha} = \sum_{\gamma=0}^{N^2-1} f_{0,\gamma} b'_{\gamma}. \qquad (20)$$

Each element of f is determined on a term by term basis according to scan order. For example, using the scan order illustrated in FIG. 7A and N=8, $b'_0 = b_{0,0}$, $b'_1 = b_{0,1}$, $b'_2 = b_{1,0}$, ... $b'_{63} = b_{7,7}$, then $f_{0,0} = c_{0,0} d_{0,0}$, $f_{0,1} = c_{0,0} d_{1,0}$, $f_{0,2} = c_{0,1} d_{0,0}$, ... and $f_{0,63} = c_{0,7} d_{7,0}$.

In a similar fashion, the elements of the DCT-domain motion compensation (MC) matrix of the (G) are found. In one preferred embodiment, the memory 1708 includes a complete set of G matrices to account for all possible integer pixel sub-block placements within the motion compensated block. As those skilled in the art are well aware, MPEG-2 allows for half pixel translations of a sub-block, which are accomplished through a linear combination of integer pixel translations. For the sake of clarity, motion vectors that translate a block of pixels from a reference frame into an inter-coded frame are considered to be integer translations, but those skilled in the art understand half-integer translations, and such translations are considered to be within the scope of the invention.

Motion Compensation

Figure 18:
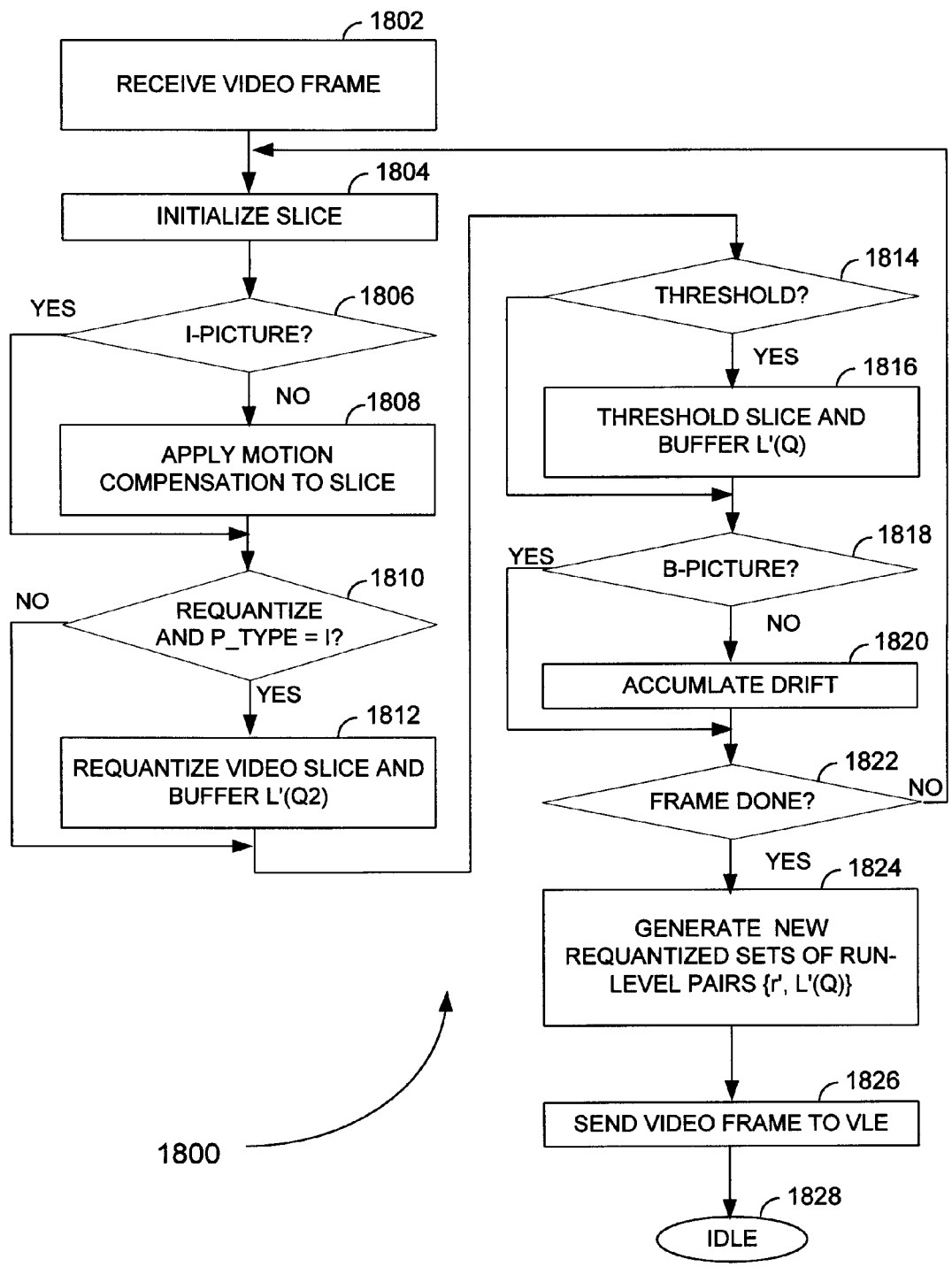
FIG. 18 is a flow chart of steps taken in requantizing and thresholding a digital stream.
Figure 19:
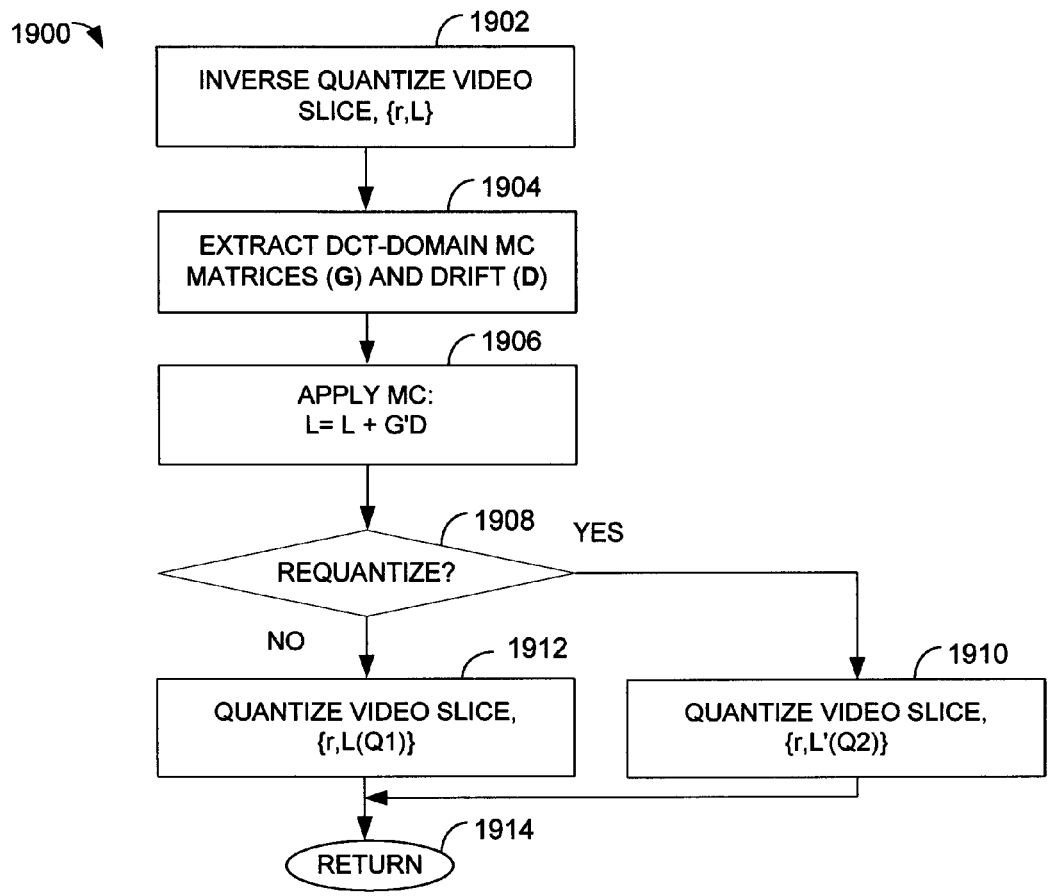
FIG. 19 is a flow chart of steps taken in motion compensation.
Figure 20:
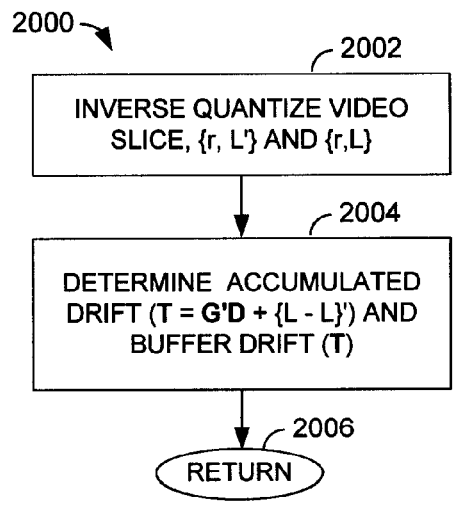
FIG. 20 is a flow chart of steps taken in accumulating drift.

FIGS. 18-20 illustrate exemplary logic that is implemented by the transcoder 134 for applying motion compensation in the run-level domain to frames that are transcoded. In FIG. 18, steps 1800 illustrate one embodiment, among others, for applying a motion compensation scheme within the transcoder 134, responsive to the transcoder 134 selectively reducing the bit size of a frame using either requantization or thresholding or both requantization and thresholding. In FIG. 19, non-limiting exemplary steps 1900 illustrate one embodiment of the motion compensation scheme. In FIG. 20, non-limiting exemplary steps 2000 illustrate one embodiment of accumulating drift, which is introduced by requantization or thresholding or both requantization and thresholding and which is used in the motion compensation scheme illustrated in FIG. 19. In FIGS. 18-20, levels that have been processed by requantization, wherein the quantization parameter has been changed from $Q_1$ to $Q_2$, and levels that have been processed by thresholding are denoted with primes, e.g., l', whereas, levels that have not been requantized (change of quantization parameter) or have not been thresholded are not primed, e.g., l.

Refer to FIG. 18, in step 1802, the processor 1702 receives a current frame from the VLD 902. The current frame includes, among other things, headers, and sets of quantized run-level pairs denoted by $\{r, l(Q_1)\}$. If the current frame is inter-coded, it also includes among other things motion vectors. A consequence of requantization and/or thresholding is a drift in the levels of inter-coded frames. In a conventional transcoder that converts a frame back into pixel domain values, the drift is compensated by performing standard motion compensation on the difference of the pre-transcoded and transcoded reference frames, and performing a DCT of the results. The accumulated drift for a frame is made up of matrices, or equivalently 64 element arrays, of accumulated sub-macroblock drift, and the drift is in the DCT-domain. When an I-picture, the first picture in a GOP, is received, the accumulated drift (D) is set to zero. After the I-picture has been processed by requantization and/or thresholding, the drift for each sub-macroblock, i.e., the difference between the incoming levels and the processed levels, is determined. The accumulated drift (D) is buffered in drift buffers 1710 so that it can be used to correct inter-coded frames.

In step 1804, the rate controller 1704 initializes the parameters used for processing a slice of the current frame. Among other things, the rate controller 1704 determines the amount of bits to shave off of the current slice and initializes quantization parameters and thresholding parameters. In step 1806, the rate controller 1704 determines whether the current frame is an I-picture. If the current frame is an I-picture, the rate controller 1704 proceeds to step 1808 and applies motion compensation to the current slice of the current frame. Typically, P-pictures and B-pictures are also requantized as part of motion compensation and will be discussed hereinbelow. After determining that the current frame is an I-picture, or after determining the current frame is not an I-picture and applying motion compensation on the current slice of the current frame, the rate controller 1704 proceeds to step 1810 and determines whether to requantize the slice and whether the current frame is an I-picture. The rate controller 1704 proceeds to step 1812 only if both conditions are met, i.e., that the current frame is an I-picture and that it should be requantized. As previously described hereinabove, the determination to requantize or not is preferably based upon multiple parameters such as, but not limited, the reduction threshold ($R_T$), picture type, the maximum initial quantization parameter, and other parameters. As will be explained hereinbelow, if the current frame is a B-picture or P-picture, then as part of the motion compensation performed in step 1808 the rate controller 1704 determines whether to requantize the current slice, and if so, requantizes the current slice. In step 1812, the requantizer 1714 requantized the levels using the new quantization parameter Q2.

In step 1814, the rate controller 1704 determines whether to threshold the current slice. Typically, as previously described, the decision to threshold or not is based in part upon parameters such as the reduction threshold ($R_T$), the number of bits saved by requantization, and the average of the absolute values of the levels. However, other parameters including fewer parameters, different parameters or more parameters can also be used in the determination for thresholding.

If the rate controller 1704 decides to threshold the current slice the rate controller 1704 proceeds to step 1816 and thresholds the current slice. In one preferred embodiment, the thresholding is performed using the thresholding logic illustrated in FIG. 15 along with the state machine illustrated in FIG. 16. It should be noted that the levels after thresholding are denoted as L'(Q) (where Q is either $Q_1$, the initial quantization parameter, or $Q_2$, the final quantization parameter). If the levels of the current slice were not requantized, then they are functions of $Q_1$, and if they were requantized, then they are function of $Q_2$.

After thresholding, or not thresholding, the rate controller 1704 proceeds to step 1818 and determines whether the current frame is a B-picture, and if so proceeds to step 1820 and accumulates the drift in the levels caused by requantization and/or thresholding. The drift is accumulated throughout a group of pictures and reset to zero at the beginning of a new group of pictures.

In step 1822, the rate controller 1704 determines whether the current slice was the last slice of the current frame, and if so, proceeds to step 1824. On the other hand, if the current slice is not the last slice of the current frame, the rate controller 1704 returns to step 1804 and continues to process the slices of the current frame until finished.

In step 1824, the scanner 938 generates new sets of run-level pairs, which are denoted by {r',l'(Q)}, and the processor 1702 updates the accumulated drift if the current frame is a reference frame, e.g., an I-Picture or a P-Picture. The updating of the accumulated drift is done by buffering the current accumulated drift (T), which was calculated in step 1820, into the accumulated drift (D). In one preferred embodiment, the requantization and thresholding are done in parallel.

In step 1826, the processor 1702 sends the processed run-level pairs {r',l'(Q)} of the current frame to the VLE 906 for processing. The VLE 906 converts the run-level pairs into compressed data using Huffman coding and transmits the compressed frame.

Refer to FIG. 19, steps 1900 illustrate an exemplary method of applying motion compensation in the DCT-domain. In step 1902, the rate controller 1704 inverse quantizes the levels of the slice to produce unquantized levels, which are denoted as l.

In step 1904, the rate controller 1704 extracts DCT domain MC matrices (G) and selected matrices of accumulated drift (D) from the memory 1708. Each of the DCT domain MC matrices in the memory 1708 is associated with a motion vector, and the rate controller 1704 uses the motion vectors for the macroblocks of the current slice to determine which DCT domain MC matrices (G) to extract. The selected matrices of accumulated drift correspond to the reference frame sub-macroblocks for motion compensated sub-macroblocks of the current frame, and the rate controller 1704 uses the header information of the current frame to determine which matrix of accumulated drift ($D_i$) to extract, where "i" denotes that the matrix of accumulated drift corresponds to the "$i^{th}$" block of the reference frame. In other words, motion vectors of the current frame map matrices of accumulated drift to sets of run-level pairs of the current frame. When the current frame is a P-Picture, the matrices of accumulated drift are from the preceding reference frame such as an I-Picture or P-Picture. When the current frame is a B-Picture, the matrices of accumulated drift are selected from the preceding reference frame such as an I-Picture or P-Picture, and from the subsequent P-Picture reference frame.

In step 1906, for each set of run-level pairs {r,l} of the current slice the rate controller 1704 calculates motion compensation for the accumulated drift by matrix multiplication of the G matrix with the associated matrix of accumulated drift D and the product (GD) is added to the unquantized levels. The product (GD) and the unquantized level (l) are then buffered. Typically, as illustrated in FIG. 19, a block in the current frame receives information from four blocks in a reference frame, and consequently, for a set of levels $$l = l + \sum_{i=1}^{4} G_i D_i.$$

Conceptually, the G matrix maps accumulated drift associated with a sub-macroblock in reference frame into a motion compensated sub-macroblock of the current frame.

In step 1908, the rate controller 1704 determines whether the current slice should be requantized. Typically, the decision to requantize or not is performed using the logic previously described hereinabove.

In step 1910, the quantizer 1806 requantizes the levels of the current slice using the quantization parameter $Q_2$. The requantized sets of run-level pairs are denoted by {r,l'($Q_2$)}. On the other hand, if the rate controller 1704 had determined not to requantize the current slice, then in step 1912, the quantizer 1806 requantizes the levels of the current slice using the quantization parameter $Q_1$. After the unquantized levels have been converted back into quantized levels, l(Q), the rate controller 1704 is done with motion compensation.

FIG. 20 illustrates exemplary steps taken by the rate controller 1704 to accumulate drift. In step 2002, the rate controller 1704 inverse quantizes the processed levels (l'(Q)) to produce unquantized processed levels (l') for each set of levels in the current slice. If the current frame is an I-Picture, then the rate controller 1704 inverse quantizes the initial quantized levels (l'($Q_1$)) to produce unquantized non-processed levels (l) for each set of levels in the current slice. However, if the current frame is not an I-Picture, then unquantized non-processed levels (l) were produced and buffered when motion compensation was applied in step 1906. In that case, the unquantized non-processed level (l) of the current slice are extracted from the memory 1708.

In step 2004, the rate controller 1704 calculates the current accumulated drift that is associated with each set of run-level pairs in the current slice, and buffers the current accumulated drift in a temporary array (T). The current accumulated drift is sum of the motion compensation of the accumulated drift, (GD), from prior reference frames, plus the instantaneous drift, the difference in the unquantized non-processed levels (l) and the unquantized processed levels (l'), i.e., $$\text{Drift} = (l - l') + \sum_{i=1}^{4} G_i D_i.$$

The accumulated drift from prior reference frames (D) is not updated until the entire current frame has been processed, so that the accumulated drift does not include artifacts of the current frame.

In one preferred embodiment, the memory 1708 includes buffers for at least two frames worth of drift so that it can include drift for both the immediately preceding reference frame (an I-Picture or P-Picture) and the current reference frame (a P-Picture) in order to properly process B-Pictures.

In one preferred embodiment, the drift for different types of frames such as video-frames, top video-fields, and bottom video-fields are accumulated in memory 1708 separately. In this embodiment, the processor 1702 determines whether the current frame is a video-frame, i.e., non-interlaced, or a top video-field, or a bottom video-field using the header information of the current frame and then extracts the appropriate sets of drift from the memory 1708 for motion compensation and updates the appropriate sets of drift. It should be emphasized, that for the sake of clarity, the steps of motion compensation were described in a sequential manner. However, as those skilled in the art will recognize, the steps could be implemented in a different order and/or in parallel. In one preferred embodiment, steps such as, but not limited to, quantizing, inverse quantizing, calculation of new run values, and linear operations of matrices are done in parallel in enhance computational efficiency.

In one preferred embodiment, B-Pictures are processed without motion compensation. In other words, for a B-Picture steps 1900 are skipped over. Motion compensation of B-Pictures can be skipped because B-Pictures are not used as reference pictures and any drift error in the B-Pictures is not accumulated and, consequently, is used in the motion compensation of subsequent pictures. Since many MPEG-2 streams contain a majority of B-Pictures, computational efficiency is enhanced by not doing motion compensation for B-Pictures.

Although exemplary preferred embodiments of the present invention have been shown and described, it will be apparent to those of ordinary skill in the art that a number of changes, modifications, or alterations to the invention as described may be made, none of which depart from the spirit of the present invention. Changes, modifications, and alterations should therefore be seen as within the scope of the present invention. It should also be emphasized that the above-described embodiments of the present invention, particularly, any "preferred embodiments" are merely possible non-limiting examples of implementations, merely setting forth a clear understanding of the principles of the inventions.

What is claimed is:

1. A method of transcoding a digital stream of compressed frames, the method comprising:
    (a) receiving a compressed video frame having content information and non-content information included therein;
    (b) determining the total compressed size of the frame ($N_T$);
    (c) determining from at least the total compressed size of the frame the total number of bits ($N_s$) to shave from the compressed frame;
    (d) determining a plurality of statistics about a given portion of the frame, the given portion of the frame having levels corresponding to non-zero coefficients for content information of the frame;
    (e) determining whether to requantize the given portion based on at least one of the statistics about the given portion;
    (f) responsive to determining to requantize the given portion, requantizing the levels of the given portion;
    (g) determining whether to threshold the given portion based on a number of bits saved (N_saved) by requantizing the levels of the given portion;
    (h) responsive to determining to threshold the given portion, thresholding the levels of the given portion, wherein the thresholding further comprises:
        adjusting a threshold level of a threshold function based on a number of levels zeroed (cnt) in the given portion by the thresholding function and an approximate number of levels in the given portion to set to zero by thresholding (N_thresh);
        determining a final scan index threshold and a split index value (SplitIndexVal) based on the number of levels zeroed (cnt) in the given portion;
        segmenting the given portion into segments based on the split index value (SplitIndexVal); and
        thresholding the segments of the given portion with a thresholding function at the adjusted threshold level and the final scan index threshold; and
    (i) transmitting the given portion.

2. The method of claim 1, prior to step (d), further including the steps of:
    (j) decompressing the video frame into a DCT-domain, wherein in the DCT-domain blocks of pixel information are represented as blocks of levels;
    (k) parsing the frame into a plurality of portions; and
        prior to step (i), re-compressing the given portion, wherein the given transmitted in step (i) is the re-compressed given portion.

3. The method of claim 1, wherein the plurality of statistics about the given portion include the compressed content size (Ssize) of the given portion.

4. The method of claim 1, wherein the plurality of statistics about the given portion include the average of the quantization parameters used to quantize the levels of the given portion.

5. The method of claim 1, wherein the plurality of statistics about the given portion include the average of the runs in the given portion.

6. The method of claim 1, further including the steps of:
    prior to the step (e), determining the initial compressed content size (Sint) of the given portion;
    prior to the step (e), determining a target number of bits to shave (N_shave) from the given portion;
    prior to the step (i), determining the final compressed content size (Sfnl) of the given portion; and
    calculating the reduction error (e) for the given portion, wherein the reduction error is defined as the difference between the target number of bits to shave and the difference between final and initial compressed content size, e=N_shave (Sfnl−Sint).

7. The method of claim 6, further including the step of:
    accumulating the reduction error, wherein the accumulated reduction error is used in determining the number of bits to shave from a subsequent portion of the frame.

8. The method of claim 6, wherein the number of portions in the frame is $N_{portions}$, wherein the given portion is the $K^{th}$ out of the $N_{portions}$ to be processed according to steps (e), (f), (g) and (h), and further including the steps of:
    determining the total compressed content size ($C_T$) of the frame; and
    accumulating the reduction error for the preceding (K−1) portions;
    wherein the number of bits to shave from the given portion is given by $$N_{SHAVE} = S_{INT} \times \frac{N_S}{C_T} + \frac{E}{N_{portion} - K + 1},$$

where E is the accumulated reduction error for the preceding portions.

9. The method of claim 1, further including the step of:
    after step (f) and prior to step (g), re-determining at least one of the statistics of the given portion, wherein the at least one re-determined statistics about the given portion is used in step (g).

10. The method of claim 9, wherein the determined statistics include the compressed content size (Ssize) of the given portion, and the compressed content size is redetermined after the given portion has been requantized.

11. The method of claim 1, further including the steps of:
   determining a requantization parameter for the given portion based at least upon one of the determined statistics about the given portion.

12. The method of claim 11, wherein the given portion was previously quantized using a first quantization parameter ($Q_1$), wherein the requantization parameter ($Q_2$) is twice the first quantization parameter, $Q_2=2Q_1$.

13. The method of claim 11, wherein the given portion was previously quantized using a first quantization parameter ($Q_1$), wherein the requantization parameter ($Q_2$) is four times the first quantization parameter, $Q_2=4Q_1$.

14. The method of claim 11, wherein the requantization parameter is chosen such that the compressed content size of the given portion is reduced by approximately 60% to 70%.

15. The method of claim 11, wherein the requantization parameter is chosen such that the compressed content size of the given portion is reduced by at least 70%.

16. The method of claim 11, further including the step of:
   determining the picture-type of the video frame, wherein the video frame is an MPEG frame, and the group of picture-types consist of I-Picture, P-Picture and B-Picture, and wherein the picture-type of the video frame is used in determining the requantization parameter.

17. The method of claim 1, wherein the given portion of the frame is a slice of the frame having multiple blocks of levels, and the blocks of levels are thresholded in parallel.

18. The method of claim 1, wherein the thresholding of the levels of the given portion reduces a number of bits in the total compressed size of the frame ($N_T$).

19. A method of transcoding a digital stream of compressed frames, the method comprising the steps of:
   (a) receiving a compressed video frame having content information and non-content information included therein;
   (b) determining the total compressed size of the frame ($N_T$);
   (c) determining from at least the total compressed size of the frame the total number of bits ($N_s$) to shave from the compressed frame;
   (d) determining a plurality of statistics about a given portion of the frame, the given portion of the frame having levels corresponding to non-zero coefficients for content information of the frame;
   (e) determining whether to requantize the given portion based at least in part upon at least one of the statistics about the given portion;
   (f) responsive to determining to requantize the given portion, requantizing the levels of the given portion;
   (g) determining whether to threshold the given portion based at least in part on the at least one of the statistics about the given portion;
   (h) responsive to determining to threshold the given portion, thresholding the levels of the given portion;
   (i) transmitting the given portion; and
   (j) determining a requantization parameter for the given portion based on one of the determined statistics about the given portion,
   wherein the given portion is made up of multiple blocks of previously quantized levels, and step (d) includes determining both the maximum quantization parameter (Q1MAX) used in quantizing the previously quantized levels and the average of the previously quantized levels (Lavg), and wherein Q1MAX and Lavg are used in determining the requantization parameter.

20. An apparatus in a network for transcoding a digital stream of compressed frames, the apparatus comprising:
   a decoder adapted to decompress a video frame having content information and non-content information included therein into the DCT-domain, wherein the content-information carried by the frame is represented as levels in the DCT-domain, the levels corresponding to non-zero coefficients in the DCT-domain;
   a rate controller adapted to receive the video frame, parse the video frame into a plurality of portions, determine a plurality of statistics about a given portion, and determine a target number of bits to shave (N_shave) from the given portion;
   a requantizer adapted to requantize levels of the given portion;
   a thresholder adapted to threshold the given portion, wherein the rate controller determines whether the given portion should be requantized based on at least one of the statistics about the given portion and wherein the rate controller determines whether the given portion should be thresholded based on a number of bits saved (N_saved) by requantizing the levels of the given portion of the frame; and
   an encoder adapted to compress the frame, wherein the compressed size of the frame is approximately the same as a target size;
   wherein the thresholder is further adapted to:
   adjust a threshold level of a threshold function based on a number of levels zeroed (cnt) in the given portion by a thresholding function and an approximate number of levels in the given portion to set to zero by thresholding (N_thresh);
   determine a final scan index threshold and a split index value (SplitIndexVal) based on the number of levels zeroed (cnt) in the given portion;
   segment the given portion into segments based on the split index value (SplitIndexVal); and
   threshold the segments of the given portion with a thresholding function at the adjusted threshold level and the final scan index threshold.

21. The apparatus of claim 20, wherein the plurality of statistics about the given portion include the compressed content size (Ssize) of the given portion.

22. The apparatus of claim 20, wherein the plurality of statistics about the given portion include the average of the quantization parameters used to quantize the levels of the given portion.

23. The apparatus of claim 20, wherein the plurality of statistics about the given portion include the maximum quantization parameter used to quantize the levels of the given portion.

24. The apparatus of claim 20, wherein the rate controller determines the initial compressed content size (Sint) of the given portion and the final compressed content size (Sfnl) of the given portion, and the rate controller calculates the reduction error (e) for the given portion, wherein the reduction error is defined as the difference between the target number of bits to shave and the difference between final and initial compressed content size, e=N_shave−(Sfnl−Sint).

25. The apparatus of claim 24, wherein the rate controller accumulates the reduction error, and the accumulated reduction error is used in determining the number of bits to shave from a subsequent portion of the frame.

26. The apparatus of claim 24, wherein the number of portions in the frame is $N_{portions}$, wherein rate controller processes the plurality of portions sequentially and the given portion is the $K^{th}$ portion out of the $N_{portions}$ portion to be processed, the rate controller further adapted to determine the total compressed content size ($C_T$) of the frame, and accumulate the reduction error for the preceding (K−1) portions, wherein the number of bits to shave from the given portion is given by $$N_{SHAVE} = S_{INT} \times \frac{N_S}{C_T} + \frac{E}{N_{portion} - K + 1},$$

where E is the accumulated reduction error for the preceding portions.

27. The apparatus of claim 20, wherein the rate controller re-determines at least one of the statistics of the given portion responsive to requantizing the given portion, wherein the at least one re-determined statistics about the given portion is used to determine whether to threshold the given portion.

28. The apparatus of claim 27, wherein the determined statistics include the compressed content size (Ssize) of the given portion, and the compressed content size is re-determined after the given portion has been requantized.

29. The apparatus of claim 20, wherein the rate controller is further adapted to determine a requantization parameter for the given portion based at least upon one of the determined statistics about the given portion.

30. The apparatus of claim 29, wherein the given portion was previously quantized using a first quantization parameter ($Q_1$), wherein the requantization parameter ($Q_2$) is twice the first quantization parameter, $Q_2=2Q_1$.

31. The apparatus of claim 29, wherein the given portion was previously quantized using a first quantization parameter ($Q_1$), wherein the requantization parameter ($Q_2$) is four times the first quantization parameter, $Q_2=4Q_1$.

32. The apparatus of claim 29, wherein the requantization parameter is chosen such that the compressed content size of the given portion is reduced by approximately 60% to 70%.

33. The apparatus of claim 29, wherein the requantization parameter is chosen such that the compressed content size of the given portion is reduced by at least 70%.

34. The apparatus of claim 20, wherein the given portion of the frame is a slice of the frame having multiple blocks of levels, and the blocks of levels are thresholded by the thresholder in parallel.

35. The apparatus claim 20, wherein the given portion of the frame is a slice of the frame having multiple blocks of levels, and the blocks of levels are thresholded by the thresholder in parallel.

36. The apparatus of claim 20, wherein the thresholder is further adapted to:
determine an approximate number of levels in the given portion to set to zero by thresholding (N_thresh), wherein the approximate number of levels in the given portion to set to zero by thresholding (N_thresh) is based on:
a number of levels in the given portion (Ncoef);
a number of levels in the given portion that were zeroed by the requantizing of the levels of the given portion ($Q_Q$);
a reduction threshold ($R_T$) of the given portion;
a weighted function of an average run value of the given portion (A(Run_avg));
and
a compressed size of the given portion ($S_{size}$).

37. An apparatus in a network for transcoding a digital stream of compressed frames, the apparatus comprising:
a decoder adapted to decompress a video frame having content information and non-content information included therein into the DCT-domain, wherein the content-information carried by the frame is represented as levels in the DCT-domain, the levels corresponding to non-zero coefficients in the DCT-domain;
a rate controller adapted to receive the video frame, parse the video frame into a plurality of portions, determine a plurality of statistics about a given portion, and determine a target number of bits to shave (N_shave) from the given portion;
a requantizer adapted to requantize levels of the given portion;
a thresholder adapted to threshold the given portion, wherein the rate controller determines whether the given portion should be requantized based on at least one of the statistics about the given portion and wherein the rate controller determines whether the given portion should be thresholded based on a number of bits saved (N_saved) by requantizing the levels of the given portion of the frame; and
an encoder adapted to compress the frame, wherein the compressed size of the frame is approximately the same as a target size;
wherein the rate controller is further adapted to determine a requantization parameter for the given portion based at least upon one of the determined statistics about the given portion;
wherein the given portion is made up of multiple blocks of previously quantized levels, and the rate controller determines both the maximum quantization parameter (Q1MAX) used in quantizing the previously quantized levels and the average of the previously quantized levels (Lavg), and wherein Q1MAX and Lavg are used in determining the requantization parameter.

38. A method of transcoding a digital stream of compressed frames, the method comprising:
(a) receiving a compressed video frame having content information and non-content information included therein;
(b) determining the total compressed size of the frame ($N_T$);
(c) determining from at least the total compressed size of the frame the total number of bits ($N_s$) to shave from the compressed frame;
(d) determining a plurality of statistics about a given portion of the frame, the given portion of the frame having levels corresponding to non-zero coefficients for content information of the frame;
(e) determining whether to requantize the given portion based on at least one of the statistics about the given portion;
(f) responsive to determining to requantize the given portion, requantizing the levels of the given portion;
(g) determining whether to threshold the given portion based on a number of bits saved (N_saved) by requantizing the levels of the given portion;
(h) responsive to determining to threshold the given portion, thresholding the levels of the given portion;
wherein the thresholding of the given portion further comprises:
determining an approximate number of levels in the given portion to set to zero by thresholding (N_thresh);
determining a number of levels zeroed (cnt) in the given portion by a threshold function having a threshold level;
adjusting the threshold level of the threshold function based on the number of levels zeroed (cnt) in the given portion and the approximate number of levels in the given portion to set to zero by thresholding (N_thresh);

adjusting a scan index threshold based on the number of levels zeroed (cnt) in the given portion, an upper limit (UL) on a number of levels in the given potion zeroed and a lower limit (LL) on a number of levels in the given portion zeroed to determine a final scan index threshold and a split index value (SplitIndexVal);

segmenting the given portion into segments based on the split index value (SplitIndexVal); and thresholding the segments of the given portion with the thresholding function at the adjusted threshold level and the final scan index threshold; and (i) transmitting the given portion.

39. A method of transcoding a digital stream of compressed frames, the method comprising:
- (a) receiving a compressed video frame having content information and non-content information included therein;
- (b) determining the total compressed size of the frame ($N_T$);
- (c) determining from at least the total compressed size of the frame the total number of bits ($N_s$) to shave from the compressed frame;
- (d) determining a plurality of statistics about a given portion of the frame, the given portion of the frame having levels corresponding to non-zero coefficients for content information of the frame;
- (e) determining whether to requantize the given portion based on at least one of the statistics about the given portion;
- (f) responsive to determining to requantize the given portion, requantizing the levels of the given portion;
- (g) determining whether to threshold the given portion based on a number of bits saved (N_saved) by requantizing the levels of the given portion;
- (h) responsive to determining to threshold the given portion, thresholding the levels of the given portion;

wherein the thresholding of the given portion further comprises:

determining an approximate number of levels in the given portion to set to zero by thresholding (N_thresh), wherein the approximate number of levels in the given portion to set to zero by thresholding (N_thresh) is based on:

a number of levels in the given portion (Ncoef);

a number of levels in the given portion that were zeroed by the requantizing of the levels of the given portion ($R_Q$);

a reduction threshold ($R_T$) of the given portion;

a weighted function of an average run value of the given portion (A(Run_avg)); and a compressed sized of the given portion ($S_{size}$); and (i) transmitting the given portion.

* * * * *